(12) United States Patent
Hansen et al.

(10) Patent No.: US 7,398,078 B2
(45) Date of Patent: * Jul. 8, 2008

(54) METHOD AND APPARATUS FOR SECURITY IN A WIRELESS NETWORK

(75) Inventors: Thorkild Hansen, Brighton, MA (US); Michael L. Oristaglio, Newtown, CT (US)

(73) Assignee: Seknion, Inc., Houston, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 11/067,441

(22) Filed: Feb. 25, 2005

(65) Prior Publication Data

US 2005/0232057 A1    Oct. 20, 2005

Related U.S. Application Data

(60) Provisional application No. 60/550,355, filed on Mar. 5, 2004, provisional application No. 60/550,411, filed on Mar. 5, 2004, provisional application No. 60/561,433, filed on Apr. 12, 2004.

(51) Int. Cl.
*H04Q 7/20*    (2006.01)
(52) U.S. Cl. ............................ 455/410; 455/1; 455/101
(58) Field of Classification Search ......... 455/410–411; 370/335
See application file for complete search history.

(56) References Cited

U.S. PATENT DOCUMENTS

| | | | |
|---|---|---|---|
| 4,467,140 A | 8/1984 | Fathauer et al. | |
| 4,956,864 A | 9/1990 | Brockman | |
| 4,975,926 A | 12/1990 | Knapp | |
| 5,173,705 A | 12/1992 | Camiade et al. | |
| 5,252,965 A | 10/1993 | Gidwani et al. | |
| 5,265,265 A | 11/1993 | Hama et al. | |
| 5,420,589 A | 5/1995 | Wells et al. | |
| 5,495,237 A | 2/1996 | Yuasa et al. | |
| 5,550,871 A | 8/1996 | Lee | |
| 5,564,020 A | 10/1996 | Rossi | |
| 5,655,019 A | 8/1997 | McKernan et al. | |
| 5,671,219 A | 9/1997 | Jensen et al. | |
| 5,727,608 A | 3/1998 | Nusbaumer et al. | |

(Continued)

FOREIGN PATENT DOCUMENTS

CA    2307156    11/2000

(Continued)

OTHER PUBLICATIONS (Anonymous), "BellSouth Signs Wholesale Agreement With Qwest," PR Newswire, pp. 1, Feb. 6, 2002. (abstract).

(Continued)

*Primary Examiner*—Erika A Gary
(74) *Attorney, Agent, or Firm*—Fulbright & Jaworski L.L.P.

(57) ABSTRACT

The present invention relates to an apparatus and method for preventing unauthorized users from gaining access to a wireless network. A processor allows only data transmissions from the directions of the authorized users to access the network. Data transmissions from other directions are not allowed to access the network. The present invention also relates to a method and apparatus fore transmitting information only in selected directions, while in directions not selected, information cannot be inferred from the transmitted signal or signals.

26 Claims, 31 Drawing Sheets

U.S. PATENT DOCUMENTS

| | | | |
|---|---|---|---|
| 5,734,487 | A | 3/1998 | Rossi |
| 5,748,147 | A | 5/1998 | Bickley et al. |
| 5,768,264 | A | 6/1998 | Anderson et al. |
| 5,790,022 | A | 8/1998 | Delvecchio et al. |
| 5,805,055 | A | 9/1998 | Colizza |
| 5,805,643 | A | 9/1998 | Seki et al. |
| 5,838,237 | A | 11/1998 | Revell et al. |
| 5,918,155 | A | 6/1999 | Nakamura et al. |
| 5,959,367 | A | 9/1999 | O'Farrell et al. |
| 5,969,673 | A | 10/1999 | Bickley et al. |
| 5,982,322 | A | 11/1999 | Bickley et al. |
| 6,025,780 | A | 2/2000 | Bowers et al. |
| 6,028,551 | A | 2/2000 | Schoen et al. |
| 6,031,497 | A | 2/2000 | Nam |
| 6,035,039 | A | 3/2000 | Tisdale et al. |
| 6,111,550 | A | 8/2000 | Miller et al. |
| 6,175,164 | B1 | 1/2001 | O'Farrell et al. |
| 6,275,679 | B1 | 8/2001 | Elam et al. |
| 6,285,318 | B1 | 9/2001 | Schoen et al. |
| 6,294,992 | B1 | 9/2001 | Addy et al. |
| 6,397,063 | B1 | 5/2002 | Sessions et al. |
| 6,414,605 | B1 | 7/2002 | Walden et al. |
| 6,545,606 | B2 | 4/2003 | Piri et al. |
| 6,608,588 | B2 | 8/2003 | Elam |
| 6,628,205 | B2 | 9/2003 | Aguren et al. |
| 7,054,296 | B1 | 5/2006 | Sorrells et al. |
| 2001/0028302 | A1 | 10/2001 | Degrauwe et al. |
| 2002/0097157 | A1 | 7/2002 | Piri et al. |
| 2003/0026196 | A1 | 2/2003 | Chan et al. |
| 2003/0097304 | A1 | 5/2003 | Hunt |
| 2003/0179073 | A1 | 9/2003 | Ghazarian |
| 2005/0037733 | A1* | 2/2005 | Coleman et al. ............ 455/411 |
| 2005/0128985 | A1* | 6/2005 | Liberti et al. ............... 370/335 |
| 2005/0212660 | A1* | 9/2005 | Hansen et al. ............. 340/10.3 |

FOREIGN PATENT DOCUMENTS

| | | |
|---|---|---|
| EP | 0675459 | 10/1995 |
| EP | 1035502 | 9/2000 |
| EP | 1051049 | 11/2000 |
| EP | 0704717 | 10/2001 |
| EP | 1040460 | 11/2001 |
| EP | 0829167 | 3/2002 |
| EP | 1210693 | 10/2003 |
| JP | 05040893 | 2/1993 |
| JP | 05304514 | 11/1993 |
| JP | 11298238 | 10/1999 |
| JP | 00285208 | 10/2000 |
| JP | 01024547 | 1/2001 |
| JP | 01111501 | 4/2001 |
| JP | 01298377 | 10/2001 |
| JP | 02236953 | 8/2002 |
| JP | 02321725 | 11/2002 |

OTHER PUBLICATIONS (Anonymous), "Beta Awards winners: Best Debut Award—Clearwire Technologies, Inc.," Business First, vol. 17, No. 27, pp. B5, Apr. 2, 2001. (abstract).

(Anonymous), "Certicom and Fujitsu Siemens Computers sign Agreement to Strenghten Security of Fujitsu Siemens Computers Mobile Offering," PR Newswire, pp. 1, Sep. 15, 2003. (abstract).

(Anonymous), "Identix/ANADAC Appoints Former Navy Senior Executive As ANADAC Vice President of Strategic Programs," PR Newswire, pp. 1, Jan. 22, 2001. (abstract).

(Anonymous), "Identix and Datastrip Enter Into OEM Agreement to Combine Fingerprint Biometric Authentication With 2D Bar Code Technology," PR Newswire, pp. 1, Nov. 13, 2001. (abstract).

(Anonymous), "L-3 Communications Acquires Wescam Inc., a Leading Provider of Wireless Visual Information Systems; Adds Electro-optical to L-3's ISR&C Products and Subsystems," Business Wire, pp. 1, Sep. 18, 2002. (abstract).

(Anonymous), "L-3 Communications Announces Strong Third Quarter 2001 Results; Sales, Operating Income and Earnings Per Share Increase 20.2%, 19.7% and 18.8%, Respectively," Business Wire, pp. 1, Oct. 18, 2001. (abstract).

(Anonymous), "Protegrity Announces CEO and Board Appointments; Nevins, Albert and Rodgers Bring Decades of Know-How to Data Security Leader," Business Wire, pp. 1, Jul. 23, 2002. (abstract).

(Anonymous), "Qwest Communications and Perot Systems Sign $20 Million Strategic Agreement; Companies to Jointly Provide Hosting, Network, and Management Services," PR Newswire, pp. 1, Sep. 27, 2001. (abstract).

(No author), "724 Solutions and Certicom Team to Deliver First Open and Standards-based, Wireless PKI Solution for the Financial Services Industry. (public key infrastructure)(Brief Article)," Wireless Internet, vol. 2, No. 9, pp. 6, Sep. 1, 2000. (abstract).

(No author), Aether Debuts Wireless Handheld Police Application. (PocketBlue, a wireless handheld application from Aether Systems)(Product Announcement) Telephone IP News, vol. 12, No. 8, Aug. 1, 2001.

(No author), "Automated Trading Desk Selects BellSouth Infrastucture to Power eWall Street," Newswire, pp. 5412, Sep. 30, 2003. (abstract).

(No author), "Business Travellers to Benefit from EFI's Wireless Print Solution; Monzoon to Install PrintMe Networks in 100 Key Wireless Broadband Internet Access Hotspots Across Europe," Newswire, pp. 5255, Mar. 10, 2003. (abstract).

(No author), "Chameleon Debuts Configurable Processor," InsideChips. Ventures, vol. 22, No. 6, p. 23, Jun. 1, 2000.

(No author), "COMSAT Peru Inaugurates Lima Service With Advanced Wireless Telecommunications Network," PR Newswire, pp. 8008, May 26, 1999.

(No author), "Defense Contracts," Defense Daily, vol. 203, No. 47, Sep. 7, 1999.

(No author), "DEMOmobile 2003 Opens to Enthusiastic Executive Audience; Thirty-Seven New Technologies Introduced, All Designed to Improved 'Always On' Life and Work Styles," Newswire, Sep. 18, 2003 (abstract).

(No author), "Harris Corporation Awarded $13.6 Million Contract by Raytheon for U.S. Navy's DD-X-Phased Array Antenna Program," Newswire, pp. 5391, May 20, 2003. (abstract).

(No author), "Hughes Network Systems Europe Signs Value-added Reseller Agreement With EXCELERATE Technology Limited; EXECELERATE Will Market Satellite-Based VPN Services to UK & European Enterprises," Newswire, Sep. 16, 2003. (abstract).

(No author), "Infineon Enhances Leadership Position in Optical Communications, Adds XFP Modules to Expand 'Single-Source' 10 Gbps Portfolio," Newswire, p. 5454, Mar. 10, 2003. (abstract).

(No author), "Japan's T-Engine Forum and MontaVista Software Create Enhanced Ubiquitous Computing Platform," Newswire, pp. 5634, Mar. 18, 2003. (abstract).

(No author), "L-3 Communications Acquires Aeromet, Inc.," Newswire, pp. 5204, Jun. 12, 2003. (abstract).

(No author), "L-3 Communications' WESCAM Awarded US$19 Million Contract to Provide MX-20 EO/IR Sensors for Canada's CP-140 Aurora Patrol Aircraft," Newswire, pp. 5302, Jul. 31, 2003. (abstract).

(No author), "Lightsurf Debuts Platform to Deliver Wireless Imaging," Imaging Update, vol. 12, No. 11, Nov. 1, 2001.

(No author), "Lockheed Martin and TRW to build of Milstar communications satellite replacement. (In Brief)," Military & Aerospace Electronics, vol. 13, No. 2, pp. 10(1), 2002, no month listed.

(No author), "Lockheed Martin, TRW and Hughes Form Team on AEHF Satellite," Satellite Week, vol. 22, No. 22, Jun. 5, 2000.

(No author), "Matria Healthcare Signs Five New Employer Contracts for Obstetrical Disease Management Services," Newswire, pp. 2351, Feb. 12, 2003. (abstract).

(No author), "Metrocall Wireless Signs Agreement with controlGen, Remote Monitoring Equipment Innovator," Newswire, pp. 5771, Jun. 26, 2003. (abstract).

(No author), "Nextel and Aether Announce Availability of Aether PocketBlue Wireless Public Safety Application on Nextel Handsets," Newswire, pp. 5288, Mar. 5, 2003. (abstract).

(No author), "Nextel Delivers Wireless Solutions Ideal for Government; Priority Access, Emergency Group Connect and the r750plus AFU," Newswire, pp. 5091, Mar. 4, 2003. (abstract).

(No author), "Nextel Launches Wireless Imaging Broadcast and Email Messaging Solution for Public Safety," Newswire, pp. 5365, Jun. 12, 2003. (abstract).

(No author), "Nokia and F5 networks partnership delivers industry-leading internet traffic management solutions; Introducing Nokia BIG-IP Internet traffic management solutions," M2 Presswire, Publisher: M2 Communications Lts., December.

(No author), "Paradyne: AG & Paradyne announce 1st high-speed services with DSL equipment interoperability," M2 Presswire, Dec. 2, 1997. (abstract).

(No author), "PR Newswire Summary of High Tech Copy, Aug. 12, 2003, " Newswire, Aug. 12, 2003. (abstract).

(No author), "Sony Online Entertainment Inc. Licenses WiredRed's TeamSound for Real-Time Voice Chat in PlanetSide; WiredRed Technology Brings Instant Voice Interaction to New Massively Multiplayer Online Game PlanetSide," Newswire, May 20, 2003. (abstract).

(No author), "SRI Gets DARPA Technology Development Contracts Jul. 3, 1997," Newsbytes, Jul. 3, 1997. (abstract).

(No author), "Study of the realizability and performance of focused-wave pulses," IEE Conference Publication n 365, 1992; Published by IEE, Michael Faraday House, Stevenage, England, pp. 126-129, 1992. (abstract), no month listed.

(No author), "Telehublink Signs Licensing Pact With Improv Systems," Electro Manufacturing, vol. 13, No. 9, Sep. 1, 2000.

(No author), "Telephony: AT&T Wireless Services will begin distributing Bloomberg Financial Markets information to customers with PocketNet wireless phones," Communications Daily, vol. 17, No. 82, Apr. 29, 1997. (abstract).

(No author),"Telephony: Cincinnati Microwave (CM) agreed to sell digital spread spectrum cordless phone technology to Xsys New Media Technologies for $300,000," Communications Daily, vol. 17, No. 82, Apr. 29, 1997. (abstract).

(No author), "Telephony: Fitel Lucent Technologies loose tube fiber venture began 2nd phase of Ga. expansion this week," Communications Daily, vol. 17, No. 82, Apr. 29, 1997. (abstract).

(No author), "Telephony: Mich. PSC last week authorized Midcom Communications to provide local exchange service," Communications Daily, vol. 17, No. 82, Apr. 29, 1997. (abstract).

(No author), "Telephony: Northern Telecom and Communications Intelligence Corp. formed joint effort to define standards for new wireless devices," Communications Daily, vol. 17, No. 82, Apr. 29, 1997. (abstract).

(No author), "Telephony: Sentient Networks arranged $13 million in new financing from AT&T Ventures," Communications Daily, vol. 17, No. 82, Apr. 29, 1997. (abstract).

(No author), "U.S. Air Force awards Lockheed Martin, TRW team $2.698 billion contract to begin System Development and Demonstration phase of next generation military communications satellite program," M2 Presswire, Publisher: M2 Communications Ltd. Nov. 19, 2001.

(No author), "Verizon Wireless to Offer High-Speed Wireless Broadband Services for Business Customers," Newswire, Mar. 17, 2003. (abstract).

(No author), "Vivato Leverages Wi-Fi Technology to Deliver New Economics to Wireless Broadband Service," Business Wire, pp. 5525, Jun. 3, 2003. (abstract).

(No author), "Washington Group International Introduces New Sys Bear Facts about Shedding Weight and Feeling Great; New Guide Provides Step-by-step Approach for Going from Sluggish to Sizzling in Six Weeks," Newswire, Feb. 27, 2003. (abstract).

Ali et al., "Fabrication and characterization of HTS antennas for satellite communication and security system," Asia Pacif Microwave Conf Proc APMC, pp. 16, 2000. (abstract), no month listed.

Chunpei (ed.), "ICCT'98. 1998 International Conference on Communication Technology. Proceedings (IEEE Cat. No. 98EX243)," Beijing, China, Oct. 22-24, 1998. (abstract).

Crouch et al., "The realisation of GaInP/GaAs power HBTs," 1996 High Performance Electron Devices for Microwave and Optoelectronic Applications Workshops—EDMO, pp. 33-36, New York, NY, Nov. 25-26, 1996. (abstract).

Gold, "Cylink Security Used in Bluetooth Transmission Technology," Newsbytes, Sep. 27, 2000.

Heidary, "Ultra-wideband antenna arrays," IEEE Antennas and Propagation Society International Symposium. 2001 Digest. Held in conjunction with: USNC/URSI National Radio Science Meeting, Boston, MA, Jul. 8-13, 2001. (abstract).

Ohshima et al., "Fabrication and characterization of HTS antennas for satellite communication and security system," 2000 Asia-Pacific Microwave Conference. Proceedings, pp. 604-607, 2000. (abstract), no month listed.

Papanicolaou, "Signals, Waves and Transport," Technical Report, Stanford University, Standford, CA, Jan. 1, 2001 [Report Nos. AD-A395137; AFRL-SR-BL-TR-01-0525]. (abstract).

Ponnekanti et al., "Integrated location management in mobile multimedia networks and its role in the development of human tracking systems," VTC2000—Springs; 2000 IEEE 51st Vehicular Technology Conference Proceedings; May 15-18, 2000. (abstract).

Ponnekanti et al., "Investigations into integrated location management in mobile multimedia networks," First International Conference on 3G Mobile Communication Technologies, Mar. 27-29, 2000. (abstract).

Rahman et al., "REmote synchromization of high-frequency chaotic signals in semiconductor lasers for secure communications," Optics Communications, vol. 138, No. 1-3, pp. 91-94, 1997. (abstract)no month listed.

Sidiropoulos et al., "Deterministric waveform-preserving blind separation of DS-CDMA signals using an antenna array," Ninth IEEE Signal PRocessing Workshop on Statistical Signal and Array Processing, Portland, OR, Sep. 14-16, 1998. (abstract).

Tech, "AirNet Announces Successful Completion of Adaptive Array Field Trial; SuperCapacity AdaptaCell Base Station is Revolutionary and Unparalleled in Performance," Business Wire, pp. 1, Aug. 20, 2002. (abstract).

Toughlian et al., "True time delay transmit/receive optical beamforming system for phased arrays and other signal processing applications," Proceedings of the SPIE—The International Society for Optical Engineering, vol. 2155, pp. 181-191, 1994. (abstract), no month listed.

Venkataraman et al., "Adaptive microstrip antenna arrays for wireless secutiry systems," Proceedings—SPIE, The International Society for Optical Engineering, Issue 3708, pp. 128-139, 1999, (abstract), no month listed.

Vieira, "Mode-locked microchip lasers for millimeter-wave generation for optically fed wireless systems," LEOS 2000; 2000 IEEE Annual Meeting Conference Proceedings; 13th Annual Meeting, Nov. 13-16, 2000. (abstract).

Zmuda et al., "An Analysis of Delay Resolution for a True Time Delay Photonic Beamformer," Technical Report, Report Nos. AD-A304150, RL-TR-95-183, NIPS-96-48979; Final Report Oct. 1992-Mar. 1994. (abstract).

Zmuda et al., "True-time-delay photonic beamformer for an L-band phased array radar," Proceedings of SPIE—The International Society for Optical Engineering v 2560, 1995; Society of Photo-Optical Instrumentation Engineers, Bellingham, WA, USA; pp. 166-176, 1995. (abstract), no month listed.

* cited by examiner

METHOD AND APPARATUS FOR SECURITY IN A WIRELESS NETWORK

CROSS-REFERENCE TO RELATED APPLICATIONS

This application claims the benefit of U.S. Provisional Application No. 60/550,355, filed Mar. 5, 2004, U.S. Provisional Application No. 60/550,411, filed Mar. 5, 2004, and U.S. Provisional Application No. 60/561,433, filed Apr. 12, 2004, each of which is hereby incorporated by reference in its entirety.

BACKGROUND OF THE INVENTION

Wireless networks bring voice and data communications to both mobile and stationary users. The present invention is particularly suited to two types of wireless networks.

The first type of wireless network is called a wireless local area network (WLAN or Hotspot) where data and voice communications are provided within a building or within close proximity of a building. In a WLAN, users typically employ laptop computers with antennas that communicate with wall-mounted antennas connected to a wired network. The second type of wireless network is called a wireless metropolitan area network (WMAN) where data and voice communications are provided to residential and business premises via radio links that connect to the Internet backbone. The radio links are typically obtained by mounting antennas on houses and lampposts. Additionally, the present invention may be well suited for other types of wireless networks.

In wireless networks, the data signals are transmitted through air, so there is no shield protecting transmitted signals from eavesdroppers. For this reason, it is more difficult to create a secure wireless network than a secure wired network. Unauthorized users of a wireless network may potentially gain access to the network to actively steal information and change network parameters.

Phased Antenna Arrays

A phased array antenna consists of multiple antenna elements that are fed coherently to produce desired radiation patterns. For example, if the array elements, as shown in FIG. 1, are z-directed dipoles that are half a wavelength apart and all fed by the same signal, the combined radiation pattern will have a sharp peak in the direction parallel to the y-axis (the broadside direction). Alternatively, by applying different time delays to the signals that feed each dipole, the radiation pattern can be made to peak in the direction of the x-axis (the endfire direction). Thus, the radiation characteristics of the antenna array can be changed electronically without changing the physical configuration of the array.

A phased array antenna can also be used as a receiving antenna in which the elements receive the signals from the transmitters. The outputs of the elements are time shifted and combined to achieve a desired array receiving pattern. For example, if the element outputs of the array in FIG. 1 are added in phase, the array receiving pattern will have a sharp peak in the direction parallel to the y-axis (the broadside direction). In this configuration, the array will be most sensitive to signals broadcast by transmitters that are located on the y axis. Alternatively, by applying different time delays to the element outputs, the receiving pattern can be made to peak in the direction of the x-axis (the endfire direction). Thus, the receiving characteristics of the antenna array can be changed without changing the physical configuration of the array. The ability to electronically modify both transmitting and receiving characteristics makes phased arrays particularly useful for radar and communications applications.

The following books describe the theory and design of phased arrays: (1) R. C. Hansen, "Phased Array Antennas," John Wiley & Sons, 1998, (2) R. J. Mailloux, "Phased Array Antenna Handbook," Artech House, 1994, and (3) R. S. Elliot, "Antenna Theory and Design," IEEE Press, 2003.

Consider the 18-element array shown in FIG. 1 with element spacing equal to half of a wavelength. A typical sum pattern for this array is shown in FIG. 2. The sum pattern has a main beam and a number of side lobes. The sum pattern is used in radar applications to detect a target. The main beam is not narrow enough, however, to determine a precise location of the target. Antenna arrays in communication systems use sum patterns to transmit and receive data in a given direction.

FIG. 3 shows a typical difference pattern for the array shown in FIG. 1. The difference pattern has a sharp null in the main beam direction and side lobes similar to the sum pattern. The sharp null can be used in radar systems to determine the precise location of a target after it has been detected by the sum pattern. This is achieved by steering the difference pattern to the direction where the target return is exactly at the null. Difference patterns are also used to suppress jamming by placing nulls at the directions from which the jamming signals emerge.

With adaptive phased arrays, also known as smart antennas, the received signals and environmental parameters are fed to powerful processors that steer the beams to optimize performance. The technology for designing and constructing adaptive phased arrays with hundreds of elements that produce prescribed sum and difference patterns has reached a mature stage, as described in the following books: (1) M. I. Skolnik, "Radar Handbook," McGraw-Hill, 1990, $2^{nd}$ edition, (2) R. T. Compton, "Adaptive Antennas," Prentice-Hall, 1998, and (3) G. V. Tsoulos, ed. "Adaptive Antennas for Wireless Communications," IEEE Press, 2001.

Wireless Communications

Vivato Inc. and ArrayComm Inc. have implemented adaptive phased array antennas systems that enhance the performance of wireless communication systems. These systems are commercially available at the present time.

Vivato Inc. uses smart antennas. According to Vivato publications, Vivato technology implements a phased-array antenna to create narrow beams of "wireless fidelity" ("Wi-Fi") transmissions that are directed to clients on a packet-by-packet basis. Using a technology Vivato refers to as Packet-Steering™, a Wi-Fi beam is formed for the duration of a packet transmission. When transmitting data, rather than transmit in all directions, the switches transmit narrow Wi-Fi beams anywhere within a 100 degree field of view. The result is that the switch concentrates RF energy into a narrow beam, which allows Wi-Fi switches to extend the range of Wi-Fi, typically only tens of meters, to kilometers. While the distance range is extended, the switch directs radio energy at specific clients within a narrow beam. Additionally, the directional nature of the transmissions reduces interference.

Vivato Switches enable parallel operations to numerous users by communicating on three non-overlapping channels simultaneously. The switch capacity is flexible and can be used when and where it is needed because it can communicate with all of the devices within the wide field of view. Vivato Wi-Fi Switches support and communicate directly with client devices based on the 802.11b standard.

ArrayComm IntelliCell™ technology is directed to interference management and signal quality enhancement using antenna arrays. A typical base station uses a single antenna or pair of antennas to communicate with the users, but a base station equipped with ArrayComm IntelliCell™ technology employs an antenna array with sophisticated signal processing to reduce the amount of excess energy radiated by the base station. Simultaneously, the signal processing allows the base station to respond selectively to users, mitigating the effects of interference introduced by other network users. The ArrayComm antenna array also provides a gain in signal power, improving the radio link quality while using the same amount of total power radiated by the base station and user terminal. Improved link quality translates into higher data rates, extended range, and longer battery lifetimes at the user terminals. With IntelliCell™ technology, each cell in a network can use the same frequency allocation by eliminating inter-cell interference. Additionally, ArrayComm technology enables a system to reuse a frequency allocation within a given cell by directing energy only where it is required. IntelliCell™ technology uses an antenna array to increase the capacity of cellular networks by factors of from 3 to 40.

ArrayComm Inc. recently participated in a test described in an article entitled "iBurst System Showcased in Latest Broadband Wireless Demo" from Broadband Wireless Exchange Magazine, published by Broadband Wireless Exchange. (The article is available at www.bbwexchange.com/publications/newswires/page546-638770.asp.) Further, the founder of ArrayComm published an article in Scientific American that describes the capabilities of modem array antenna systems. (M. Cooper, "Antennas Get Smart," Scientific American, pp. 49-55, July 2003).

Security Features in Wireless Communications

Currently commercially available wireless communication systems rely on one or more of the following types of security features: encryption, authentication, scanning and monitoring to detect unauthorized transmissions, highly directive antennas, and placement of nulls in receiving patterns.

Each of these security approaches has flaws. The article "The key vanishes," published in the New York Times, Feb. 20, 2001, describes how even "unbreakable" encryption codes can be overcome. Peter G. Neumann, SRI, security expert, is quoted in this article as saying, "If you think cryptography is the answer to your problem, then you don't know what your problem is."

Authentication cannot prevent an unauthorized user from getting access to the network if that user steals the identification parameters of an authorized user by eavesdropping. Similarly, with scanning and monitoring one cannot detect an unauthorized user if that user has stolen the identification parameters of an authorized user.

Highly directive antennas radiate narrow beams that have very low values outside a main-beam direction, but such narrow beam antennas still radiate intelligible signals in all directions that may be understood by receivers with high gains. One example of a narrow-beam radiation pattern is shown in FIG. 2. However, even when the receiving array is highly directive, an unauthorized user can still gain access to the network by broadcasting high-energy signals. This will be demonstrated below in an example.

Placement of nulls in receiving patterns is an effective way of blocking an unauthorized transmitter that is located at a known point in the far field of the receiving array. However, if the unauthorized transmitter moves around, the receiving array has to track the transmitter and continuously modify its receiving pattern. This is a complex task and may not be practical for wireless communication systems. Moreover, the nulling approach does not work well if the unauthorized transmitter is in the near field of the receiving array. Mailloux describes a further limitation of nulling: "An N-element array can have up to (N−1) nulls, and in principle can cancel up to (N−1) interfering signals. In practice, one cannot place too many of the nulls close together without incurring severe pattern distortion." (Mailloux, page 170.) Hence, if the receiving array has only a few elements, one is capable of canceling only a few unauthorized transmitters.

One article related to wireless network security issues and market demands for better security, instead of more security products, is *Security is the #1 WLAN [Wireless LAN] deployment barrier* by Mike Klein, CEO Interlink Networks. (This article is available at www.intel.com/capital/cases/wifi_infrastructure.htm#Interlink.)

The present invention overcomes the aforementioned problems and provides a physical layer of security for wireless communications that makes the transmitted signals unintelligible in all but the selected direction or directions. The physical layer of security makes the wireless networks more like wired networks and works in conjunction with existing security measures.

BRIEF SUMMARY OF THE INVENTION

The present invention is directed to a method for securely transmitting data over radio waves comprising the steps of transmitting one or more data beams comprising the data with a radiation pattern, transmitting one or more scramble beams comprising one or more signals from which data cannot be inferred and one or more radiation patterns, and adjusting the data beams and the scramble beams such that the scramble beams overshadow the data beams in all but selected directions. A scramble beam can contain a separate intelligible data stream intended for receivers located in the directions where that scramble beam overshadows all other beams.

In one embodiment of the present invention, the scramble beam contains an intelligible data stream that is used to convey information, for transceivers located in the directions where that scramble beam overshadows all other beams, about which of these transceivers will be next in line to communicate with the array using one of the secure data beams. In one embodiment of the present invention, the communication channel provided by the scramble beam is used to organize a "contention period," for transceivers located in the directions where that scramble beam overshadows all other beams, about which of these transceivers will be next in line to communicate with the array using one of the secure data beams. In one embodiment of the present invention, the scramble beam organizes a contention period using any of the well-known methods for medium access control in multiple access communication channels, such as binary countdown (Tanenbaum, *Computer Networks*, p. 260).

In one embodiment of the present invention, the scramble beams comprise one or more difference patterns. In one embodiment of the present invention, the data signal beams comprise one or more sum patterns. In one embodiment of the present invention, the method further comprises the step of adjusting the data beams and the scramble beams using beam steering.

In one embodiment of the present invention, the method further comprises the steps of transmitting the data beams and transmitting the scramble beams using one or more array antennas. In one embodiment of the present invention, the method further comprises the step of adjusting the data beams and the scramble beams using analytical array synthesis techniques. In one embodiment of the present invention, the method further comprises the step of adjusting the data beams and the scramble beams using iterative array synthesis techniques.

In one embodiment of the present invention, the data signal bits are divided into two or more parts. For each part of the data signal, a corresponding scramble-beam direction is defined that is slightly away from the direction of the data beam. Each part of the data signal is then transmitted while the scramble beam has its central null steered. towards a corresponding scramble-beam direction. The division of the data signal must be such that an intelligible signal is obtained only if all the data bits are received In one embodiment of the present invention, the scramble beams have approximately constant amplitudes away from their central null, so that the total radiated power is approximately omni-directional. Constant-amplitude scramble beams are achieved by moving zeros far off the Schelkunoff unit circle or by iterative methods.

In one embodiment of the present invention, the method further comprises the step of transmitting the data beams and the scramble beams using a planar array antenna. In one embodiment of the present invention, the method further comprises the step of transmitting the scramble beams using cosine and sine difference patterns.

In one embodiment of the present invention, the method further comprises the step of transmitting data and scramble beams with spatial dependencies that are indistinguishable away from the null of the scramble beam.

In one embodiment of the present invention, one or more of the secure data beams are scanned in angular increments over the area within range of the array using beam steering while transmitting at each angle a unique identification number that can be recorded by transceivers to whom the data beam is intelligible and returned to the array as a method of identifying and locating the positions of transceivers within range of the array. In one embodiment of the present invention, the identification numbers returned to the array are used to create and store a table indicating the current positions and signal strengths of all transceivers within range of the array. In one embodiment of the present invention, the transceivers are RFID tags. In one embodiment of the present invention, the transceivers are laptop computers. In one embodiment of the present invention, the transceivers are cell phones.

Embodiments of the present invention are directed to methods for securely and simultaneously transmitting multiple data streams over radio waves comprising transmitting one or more data beam comprising multiple data signals with multiple radiation patterns, transmitting one or more scramble beam comprising multiple signals from which the data cannot be inferred with radiation patterns, and adjusting the data beam and the scramble beams such that a scramble beam overshadows each data beam in all but selected directions.

The present invention is directed to a method for preventing unauthorized transmitters from gaining access to a wireless network. One embodiment is a method comprising the steps of receiving signals with an antenna system that has more than one output port, computing a first output with a first receiving pattern that has its main beam pointed towards an authorized transmitter, computing a second output with a second receiving pattern that has a null in the direction of the authorized transmitter and is larger in magnitude than the first receiving pattern away from the authorized transmitter, computing the energy of the first and second outputs, and passing the information contained in the first output on to the network only if the energy of the first output is larger than the energy of the second output.

In one embodiment of the present invention, the second receiving pattern is computed from a combination of one or more difference patterns. In one embodiment of the present invention, the first receiving pattern is computed from a combination of one or more sum patterns.

In one embodiment of the present invention, the step of computing the first and second outputs uses beam steering. In one embodiment of the present invention, the step of receiving signals uses one or more array antennas.

In one embodiment of the present invention, the step of computing the first and second outputs uses analytical array synthesis techniques. In one embodiment of the present invention, the step of computing the first and second outputs uses iterative array synthesis techniques.

In one embodiment of the present invention, the step of receiving signals uses a planar array antenna. In one embodiment of the present invention, the step of computing the first and second outputs uses cosine and sine difference patterns.

In one embodiment of the present invention, the step of receiving signals uses a ring array antenna. In one embodiment of the present invention, the step of receiving signals uses a reflector antenna.

DETAILED DESCRIPTION OF THE INVENTION

The invention is first described for the transmission process, and subsequently for the receiving process.

The Transmission Process

A physical layer of security may be obtained with the present invention by feeding each element of an array with a total signal that is obtained by adding at least one scramble signal to the data signal. Two types of array patterns widely used in radar applications are of particular interest to the present invention: (1) the sum pattern and (2) the difference pattern.

The system for providing a secure radio link consists of an array of antennas, electronics, and processors that control the electronics. Assume, for example, that it is desirable to use the array to transmit data to a particular client. The time signal is represented by a(t); and represents the required time signal that must be fed to the array elements to facilitate the data transmission. The time signal a(t) depends on the chosen modulation and coding techniques and on the transfer functions of the antenna elements. The present invention works for any modulation and coding techniques and for any set of array elements. The term "data signal" is used to describe a(t) because the data for the intended client is embedded in a(t). For purposes of illustration, we will first consider linear arrays such as the 18-element array in FIG. 1.

Linear Arrays

Figure 1:
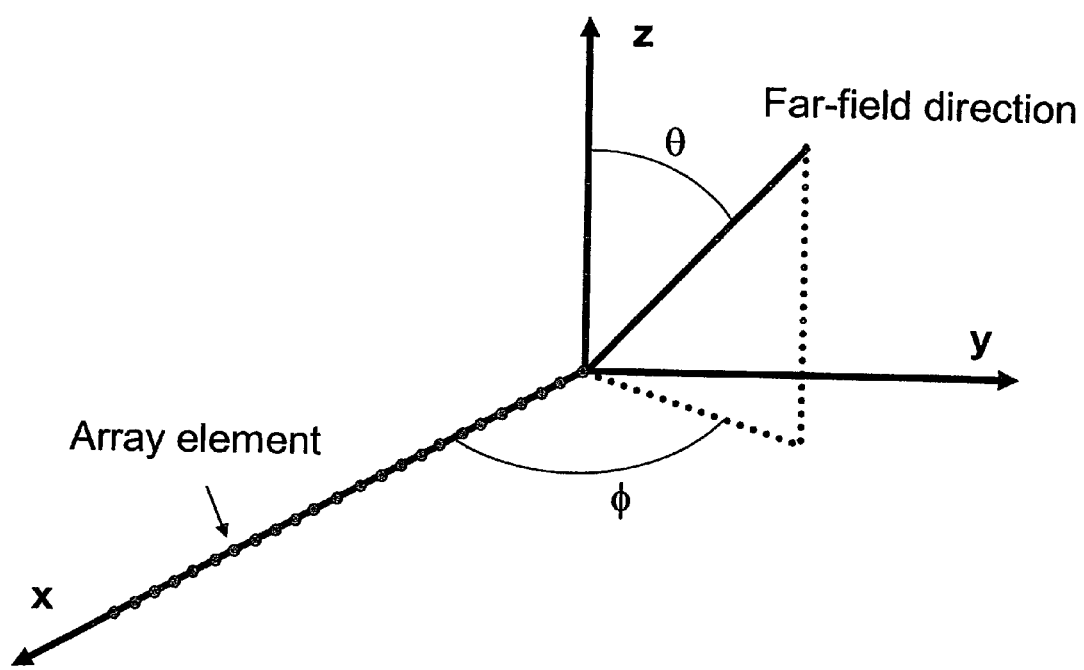
FIG. 1 illustrates a linear array with 18 elements having element spacing equal to half a wave length.

FIG. 1 is a graph of a linear array with 18 elements having element spacing of half of a wavelength. In standard operation, one would feed array element #p with a signal of the form:

$$T_p(t) = A_p a(t - \alpha_p)$$

where $A_p$ is the excitation coefficient and $\alpha_p$ is the time delay (p=1, 2, ..., N). Generally, one could feed each array element with time functions that have different time dependence to compensate for array imperfections, end-element effects, or array elements differences. Such adjustments would be well known and straightforward to those working in this area. Therefore, for the purpose of this example, it is assumed that the time dependence of each input signal is the same (the amplitudes and time delays are different). The array excitation coefficients and time delays ($A_p$ and $\alpha_p$, p=1, 2, ..., N, where N is the number of elements) are determined by standard methods to achieve a desired radiation pattern of the array that adapts to its environment.

Figure 2:
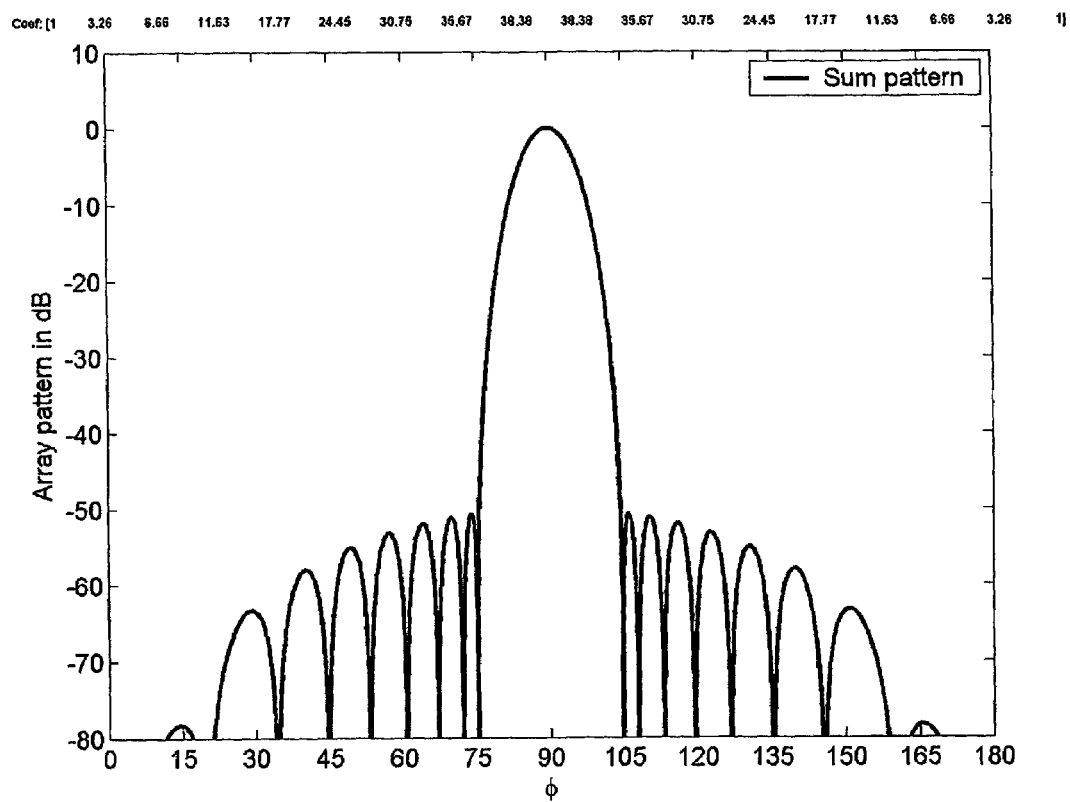
FIG. 2 illustrates a sum pattern of the array in FIG. 1 evaluated at $\theta=90°$. The array coefficients shown above the plot can be used for both transmission and reception.

FIG. 2 is a graph of a sum pattern of the 18 element array shown in FIG. 1, evaluated at $\theta=90°$. A typical array radiation pattern and the associated excitation coefficients are shown in FIG. 2 for the 18-element linear array shown in FIG. 1. The element spacing is equal to half a wavelength. All time delays are zero, so the array operates in broadside mode. Since all the excitation coefficients have the same sign, the array radiates a sum pattern, which is characterized by a main beam and some side lobes that are below a certain level (−55 dB in the embodiment shown in FIG. 2). Beam steering can be achieved by assigning nonzero values to the time delays, which results in the complex excitation coefficients $A_p \exp(i2\pi f_0 \alpha_p)$ when the $\exp(-i2\pi f_0 t)$ time dependence is suppressed and $f_0$ is the frequency at which the sum pattern is evaluated. These issues are well known to those working in this area.

Figure 3:
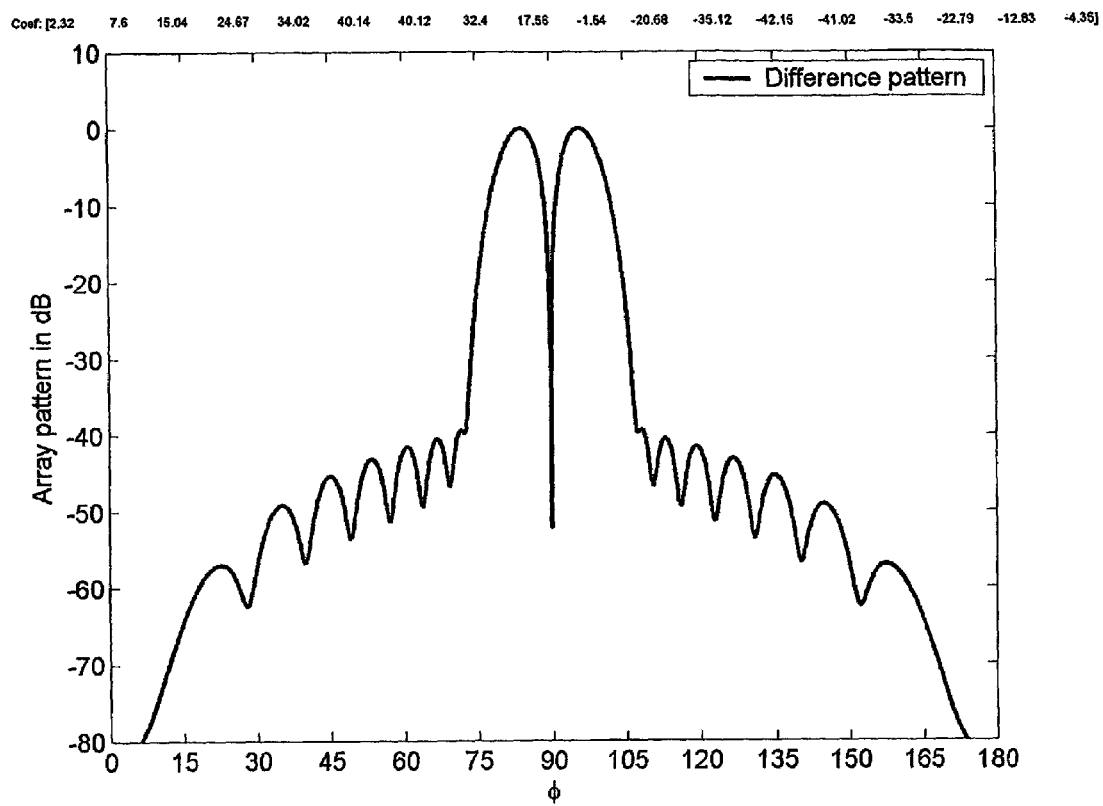
FIG. 3 illustrates a difference pattern of the array in FIG. 1 evaluated at $\theta=90°$. The array coefficients shown above the plot can be used for both transmission and reception.

In addition to the sum pattern, a difference pattern may be broadcast. A difference pattern and the associated excitation coefficients are shown in FIG. 3 for the 18-element array shown in FIG. 1. The difference pattern has a deep null in the center that is surrounded by two steep peaks. The term "difference pattern" is used because half of the excitation coefficients are positive and the other half negative. The time delays in FIG. 3 are all zero. As seen for the sum pattern, beam steering can be achieved by assigning nonzero values to the time delays.

A physical layer of security is obtained with the present invention by feeding each element with a total signal that is obtained by adding at least one scramble signal to the data signal. In the case of one scramble signal b(t), the total input signal to array element #p is:

$$T_p(t) = A_p a(t - \alpha_p) + B_p b(t - \beta_p)$$

where $B_p$ (p=1, 2, ... N) are the excitation coefficients and $\beta_p$ (p=1, 2, ... N) are time delays for the scramble signal. This simple arrangement of signals creates a physical layer of security when the data excitation coefficients $A_p$ (p=1, 2, ...

N) produce a sum pattern and the scramble excitation coefficients $B_p$ (p=1, 2, ... N) produce a difference pattern. To steer the sum and difference beams in the same direction, one simply sets $\alpha_p=\beta_p$.

Figure 4:
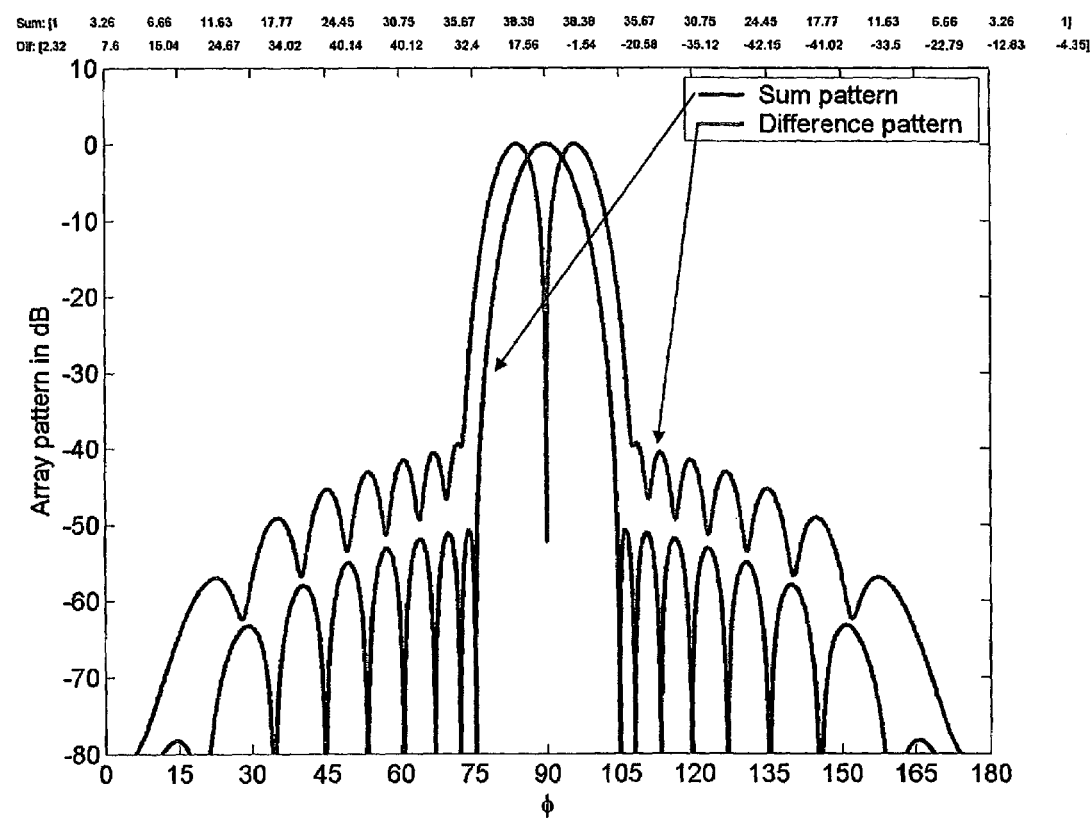
FIG. 4 illustrates the sum and difference patterns of the 18-element array evaluated at $\theta=90°$. The two sets of array coefficients shown above the plot can be used for both transmission and reception.

To see how a physical layer of security is provided, the sum and difference patterns of FIGS. 2 and 3 are plotted together and shown in FIG. 4. The data signal a(t) is transmitted through the sum pattern and the scramble signal is transmitted through the difference pattern. An observer located at the nulls of the difference pattern will receive only the data signal. Conversely, an observer located at nulls of the sum pattern will receive only the scramble signal. In most locations, however, there are no nulls and an observer would receive a weighted sum of the data and scramble signals. The weights are simply the sum and difference patterns at that particular location.

As shown by way of example in FIG. 4, it is evident everywhere outside the narrow angular region 87°<φ<93° that the difference pattern is greater in magnitude than the sum pattern. Hence, an observer located at the angle φ will receive the following signals:

φ=90°: the pure data signal a(t).
87°<φ<93°: a weighted sum of data and scramble signals in which the weight for the data signal is greatest.
0°<φ<87° or 93°<φ<180°: a weighted sum of data and scramble signals in which the weight for the scramble signal is greatest.

With any radio receiver, if the signal to noise ratio falls below a certain level, the receiver cannot demodulate the signal properly to recover the information. Consequently, in this example, only observers in the narrow angular region 87°<φ<93° will understand the data signal. Additionally, the angular region in which the data signal can be understood is likely even narrower due to noise.

The physical layer of security achievable with an 18 element array (as shown in FIG. 1) and with the present invention is demonstrated. The data signal is shielded by a scramble signal that makes the transmitted signal unintelligible in every direction except in a narrow angular region around the direction of the intended receiver. As a consequence, the area requiring monitoring for possible eavesdroppers is significantly reduced when this extra layer of physical security is added. In fact, an eavesdropper must be almost in the line-of-sight between the transmitter and receiver and may thus disturb the electromagnetic field in a way that is readily detectable.

The sum and difference patterns in FIG. 4 are almost parallel in the region where they attain values above −40 dB, except near the central null of the difference pattern. Therefore, the spatial dependence of the data and scramble signals are almost the same in this region. If signals below −40 dB are below the noise floor, the data and scramble signals cannot be separated based on the spatial dependence of the patterns, even if an eavesdropper uses an array receiver. The data and scramble beam coefficients can be determined with well-known methods to achieve patterns that are parallel to an arbitrarily high degree. One can ensure that the sidelobe region is below the noise floor by choosing the array large enough, or by adding noise sources.

EXAMPLE 1

Figure 5:
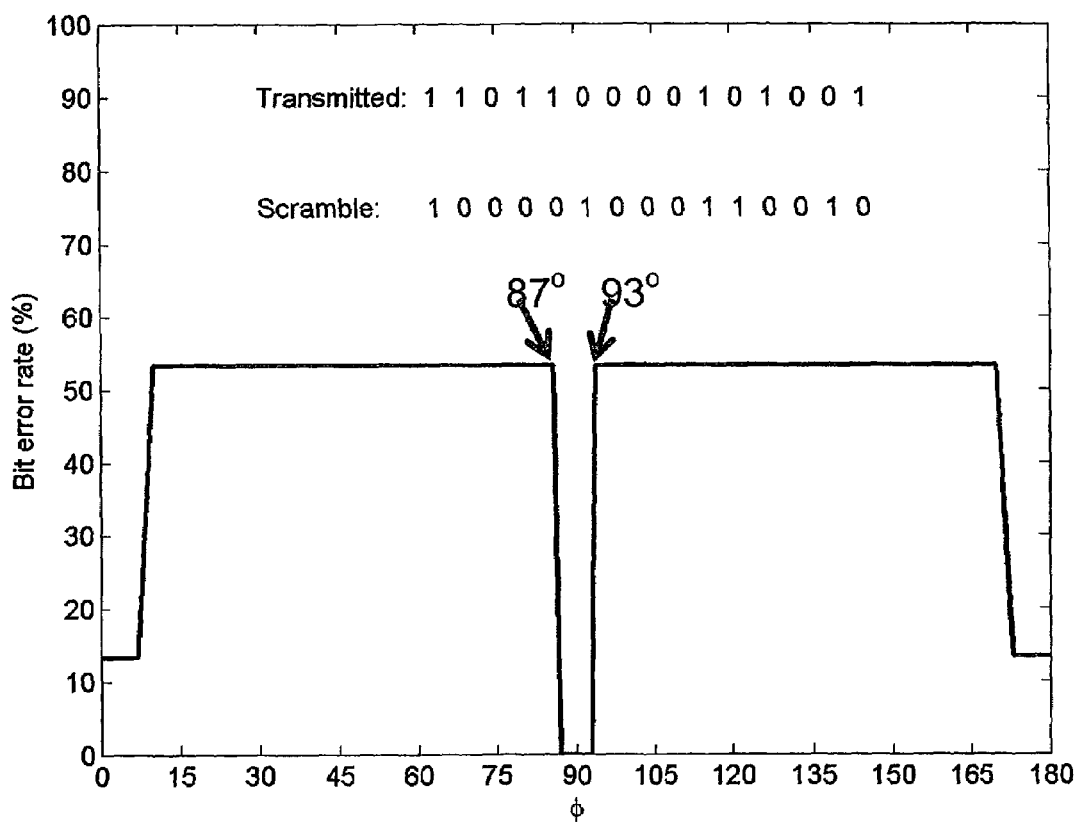
FIG. 5 illustrates the bit-error rate at $\theta=90°$ for the 18-element array.

For the purposes of this example, assume that the 18-element linear array in FIG. 1 operates at a center frequency of approximately 2.4 GHz. The element spacing is 6.25 cm and the distance between the end elements is 106.25 cm. The array is fed with sum and difference signals that result in the array patterns that are plotted as shown in FIG. 4 at 2.4 GHz. The input signal is broadband, so the array-element distance equals precisely half a wavelength only at the center frequency. With differential phase shift keying implemented using 1000 periods of a 2.4 GHz sine wave per bit, a simulation, without noise, reveals that the signal is intelligible in the φ=90° plane only in the angular region 87°<φ<93°, as shown in FIG. 5.

In the simulation, the bits are computed in the following way: First the instantaneous phase of the transmitted signal is computed with the Hilbert transform. Second, for each bit transmission period (1000 periods of the 2.4 GHz sine wave) a center phase is defined as the value of the instantaneous phase at the center of that transmission period. Finally, the received bit is set equal to one if the difference between the current and previous center phase is larger than 180°. The actual numerical value of the bit-error-rate in FIG. 5 outside the region 87°<φ<93° results from the discrepancy between the "Transmitted bits" and the "Scramble bits." To achieve high security, one may choose the scramble bits from a random sequence.

All the zeros of the difference pattern, except the center zero at φ=90°, have been moved off the Schelkunoff unit circle to ensure that the magnitude of the difference pattern is larger than the magnitude of the sum pattern throughout the angular regions 0°<φ<87° and 93°<φ<180°. As a result, the excitation coefficients for the difference pattern are not asymmetric around the center of the array. The sum of these excitation coefficients, however, still equals zero. By increasing the power of the scramble signal, one may reduce the width of the angular region in which the data signal dominates.

The array pattern resulting from any excitation of this array is symmetric around the x axis. The vector radiation pattern of the transmitted electromagnetic field, however, equals the array pattern multiplied by the element vector radiation pattern, assuming that all elements have the same radiation pattern. Hence, if the elements have radiation patterns with beams that peak at θ=90°, the transmitted electromagnetic field will have a main beam in the direction (θ, φ)=(90°, 90°). Dipoles and patch antennas have such radiation characteristics. Beam steering of both sum and difference patterns may be achieved with standard methods.

A Method for Reducing the Width of the Data Beam

Figure 6:
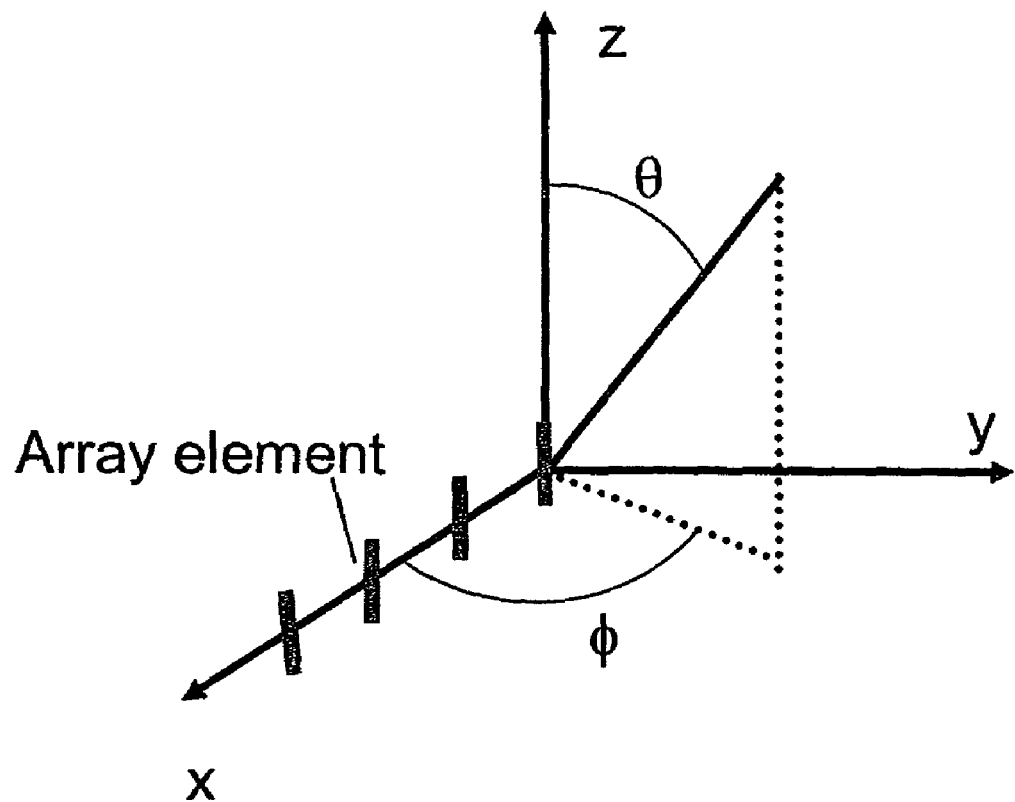
FIG. 6 illustrates a linear array with 4 elements having element spacing equal to 10 cm.
Figure 7:
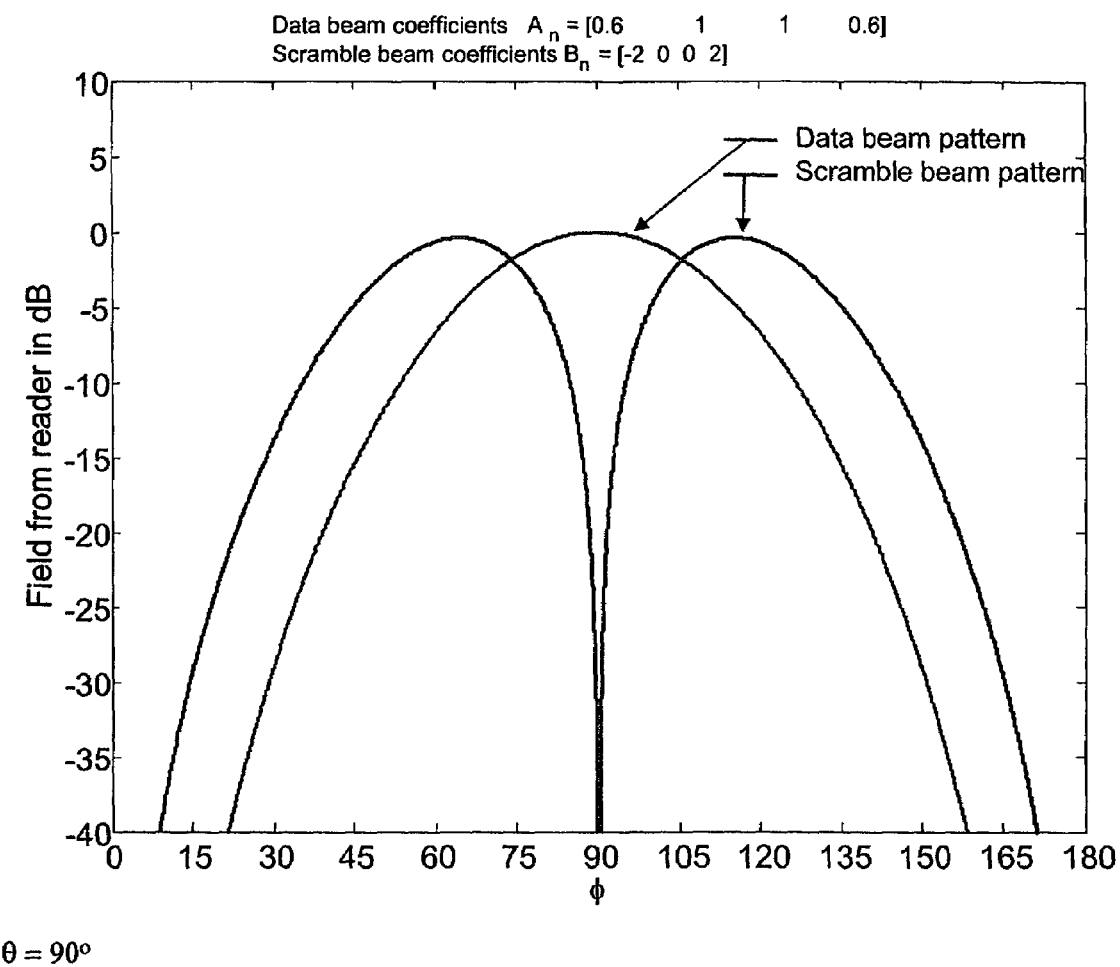
FIG. 7 illustrates data and scramble beams of the array in FIG. 6 evaluated at $\theta=90°$. The array elements are patch antennas and both sets of excitation coefficients are shown above the plot.

FIG. 6 shows a four-element array operating around 900 MHz, with element spacing=10 cm and total array length=30 cm. The intended client is located near the (θ, φ)=(90°, 90°) direction. For the purposes of this example, assume that the array elements are made of patch antennas with $\sin^2(\phi)$ radiation patterns in the forward direction and very low radiation pattern in the backward direction. FIG. 7 shows the field of this array for forward directions 0<φ<180°. The patterns of the patch antennas ensure that the field in the backward directions 180°<φ<360° is low.

The width of the angular region of the data signal is reduced by dividing the data signal bits into two parts: the first part and the second part. The first part is transmitted while the scramble beam has its central null steered slightly to one side of the direction of the data beam. The second part of the data signal is transmitted while the scramble beam has its central null steered slightly to the other side of the direction of the data beam. The division of the data signal must be such that an intelligible signal is obtained only when both the first and second part of the data signal are received.

Figure 8:
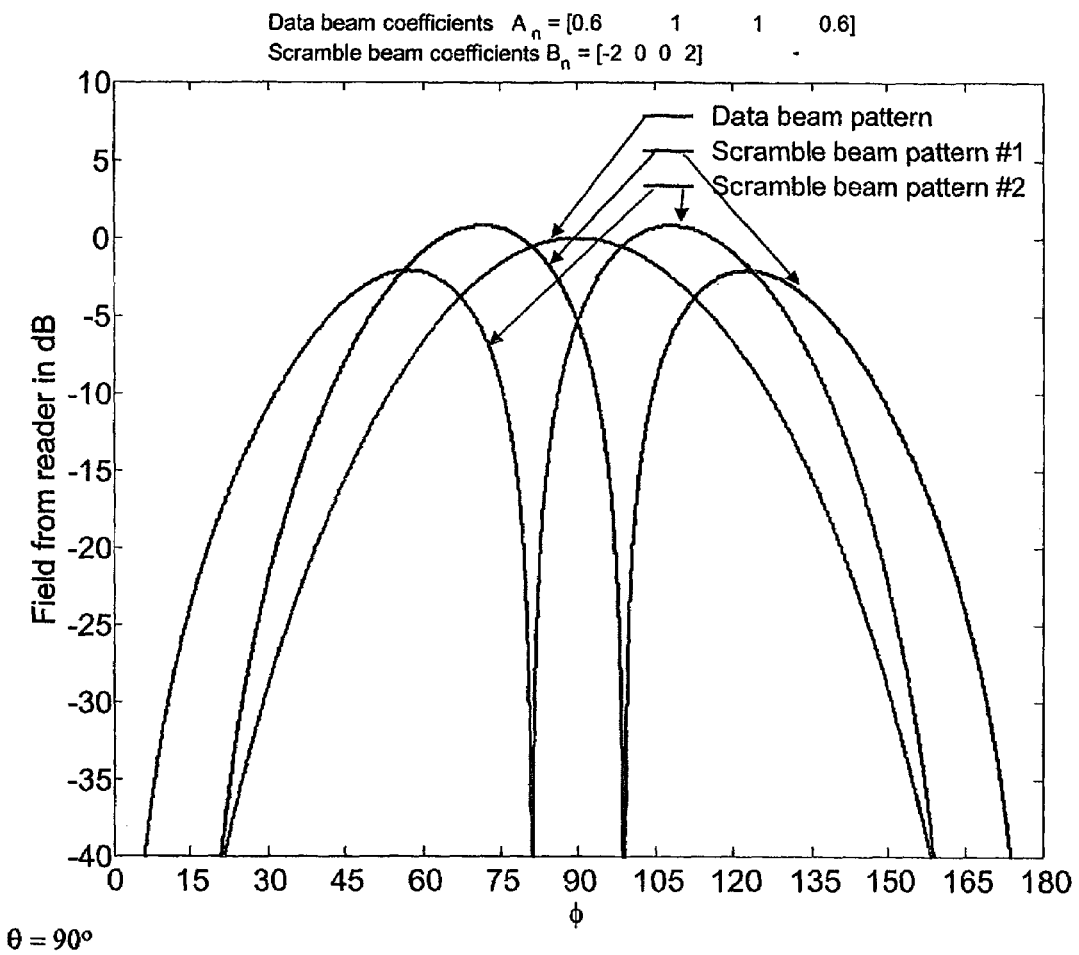
FIG. 8 illustrates one data beam and two scramble beams of the array in FIG. 6 evaluated at $\theta=90°$. The array elements are patch antennas and both sets of excitation coefficients are shown above the plot.

FIG. 8 shows how this method can be implemented with the four-element array in FIG. 6, with patch antennas.

Scramble beam #1 is obtained by steering the central null to $\phi=99°$. Scramble beam #2 is obtained by steering the central null to $\phi=81°$. The excitation coefficients are provided above the plot in FIG. 8. A receiver must then be located in a very narrow region (at most, 15° wide in this example) around $\phi=90°$ in order to receive both the first and second part of the data signal.

In principle, there is no lower limit on the width of the data-signal region obtainable with this method. One may even divide the data signal into three or more parts and employ three or more scramble beams, as long as the reception of all parts of the data beam is required to extract the data. This method of reducing the width of the data-signal region works for the other types of antennas described below. In particular, it works for planar arrays if the two scramble-beams nulls are steered in orthogonal directions (planar arrays require two scramble beams as explained below). Another way of reducing the width of the data-signal region is to continuously vary the direction of the scramble beam while the data signal is being transmitted. Another way of reducing the width of the data-signal region is to increase the power of the scramble beam(s), and thereby move the scramble-beam shoulders above the peak of the data beam.

A Constant-Level Scramble Beam

Figure 9:
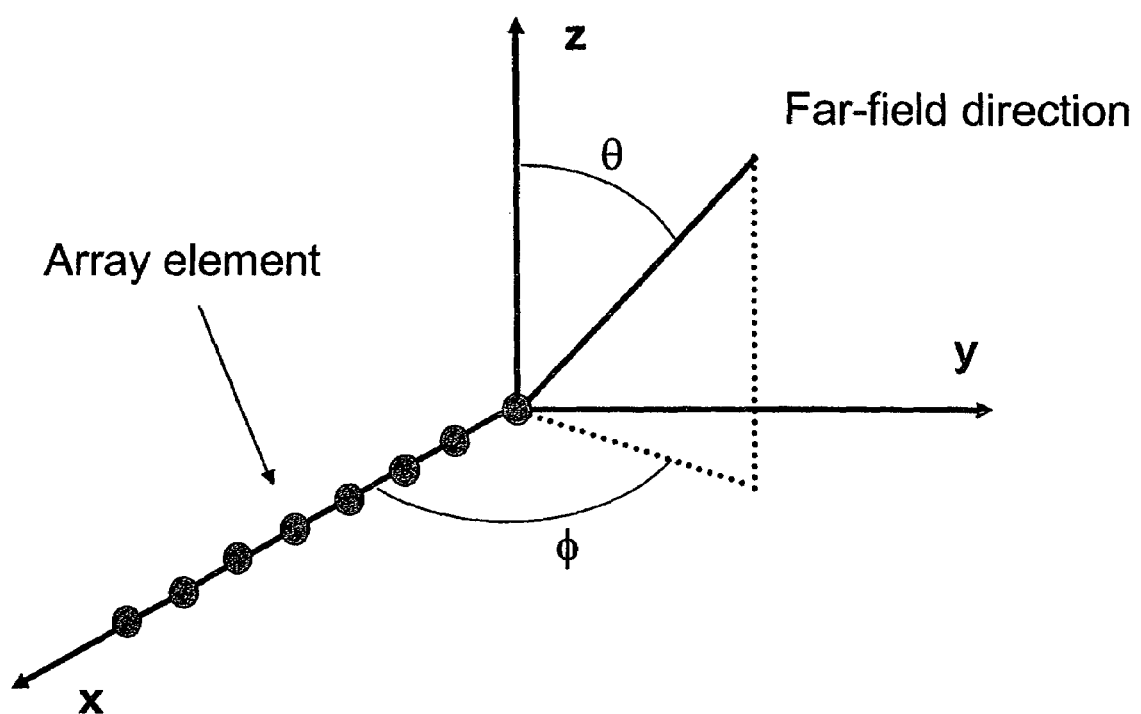
FIG. 9 illustrates a linear array with 8 elements having element spacing equal to 6.25 cm.

An array may be designed such that its radiated power is omni-directional while its data signal stays highly directional. Consider the 8-element array in FIG. 9 that consists of z-directed dipoles and operates at 2.4 GHz, with element spacing=6.25 cm and the total array length=50 cm. The intended clients are near the $(\theta, \phi)=(90°, 90°)$ direction.

Figure 10:
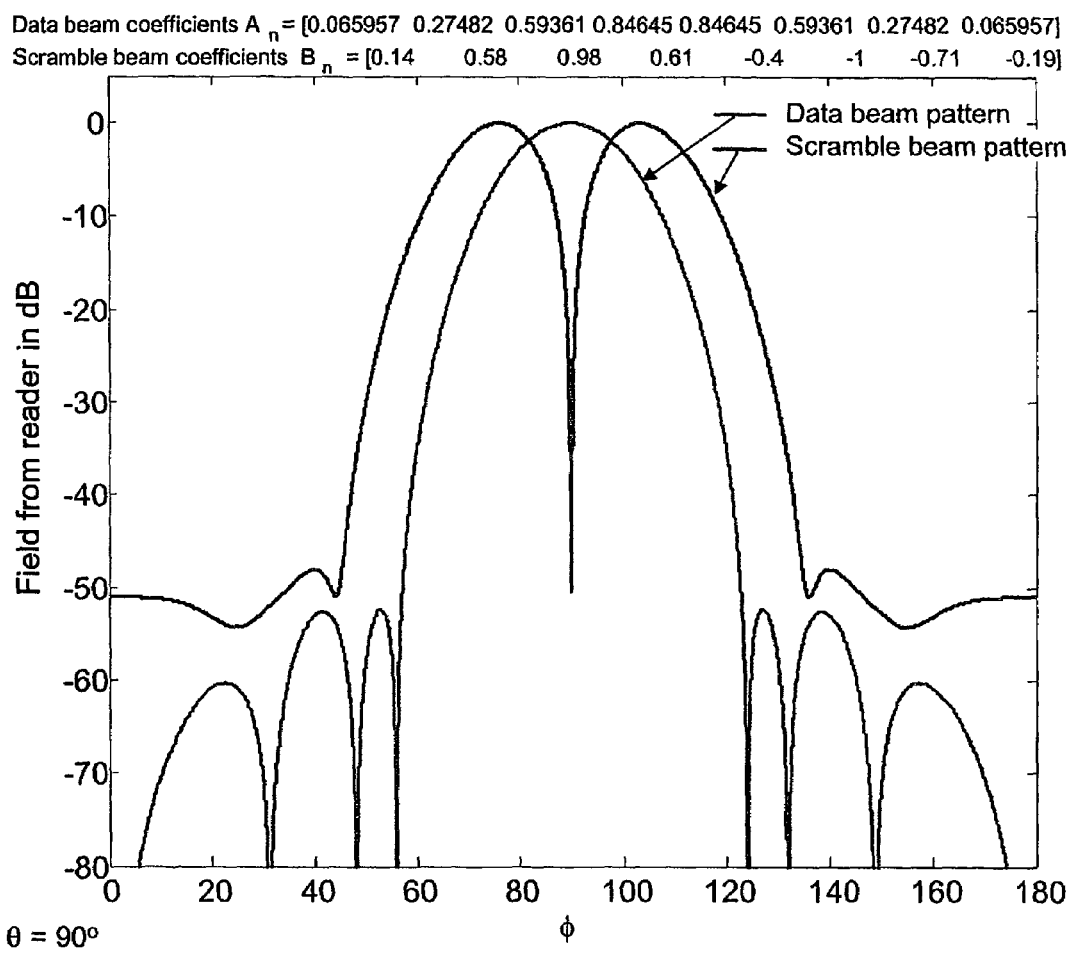
FIG. 10 illustrates one set of data and scramble beams of the array in FIG. 9 evaluated at $\theta=90°$. The array elements are z-directed dipoles and both sets of excitation coefficients are shown above the plot.

Typical data and scramble beams for this array are shown in FIG. 10. All the zeros of the scramble beam, except the central one at $\phi=90°$, are moved radially off the Schelkunoff unit circle to points on a circle in the complex plane of radius 1.06. (The theory related to the Schelkunoff unit circle is described in the reference "Antenna Theory and Design" by R. S. Elliot, IEEE Press, 2003.) As a result, the scramble beam has only one null (the central one) and stays above the data beam everywhere else. Notice that the scramble beam "follows" the data beam closely, so that the power of the scramble beam is extremely low away from a 60° angular region centered on $\phi=90°$. Hence, the array provides little energy to communicate with the clients that are located outside this 60° angular region.

Figure 11:
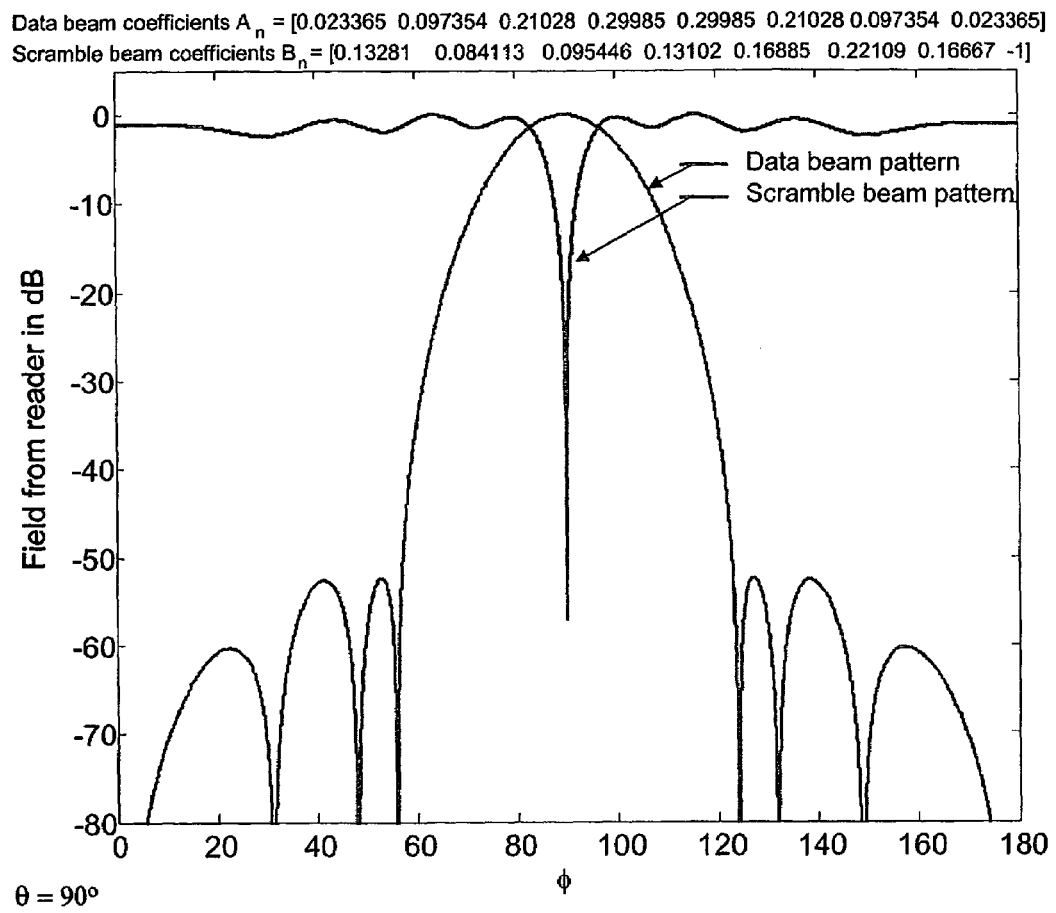
FIG. 11 illustrates another set of data and scramble beams of the array in FIG. 9 evaluated at $\theta=90°$. The array elements are z-directed dipoles and both sets of excitation coefficients are shown above the plot.

FIG. 11 shows a non-typical scramble beam that has all its zeros, except the central one, located on a circle in the complex plane of radius 1.46. This scramble beam has an almost constant amplitude away from the central zero at $\phi=90°$. Hence, it may communicate with any client located away from $\phi=90°$. The excitation coefficients are provided above the plot in FIG. 11. All the excitation coefficients for the scramble beam in FIG. 11 are positive except the last one, which equals −1. The sum of these coefficients equals zero.

The array used in this section operates at 2.4 GHz. The method for creating a reader with an omni-directional power pattern works for any frequency that results in electromagnetic wave propagation. Instead of using the Schelkunoff unit circle representation to achieve the constant-level scramble signal, one can use the iterative array-synthesis methods with appropriate cost functions. The iterative methods can be used directly to achieve constant-level scramble beams for ring arrays and planar arrays.

Planar Arrays

Figure 12:
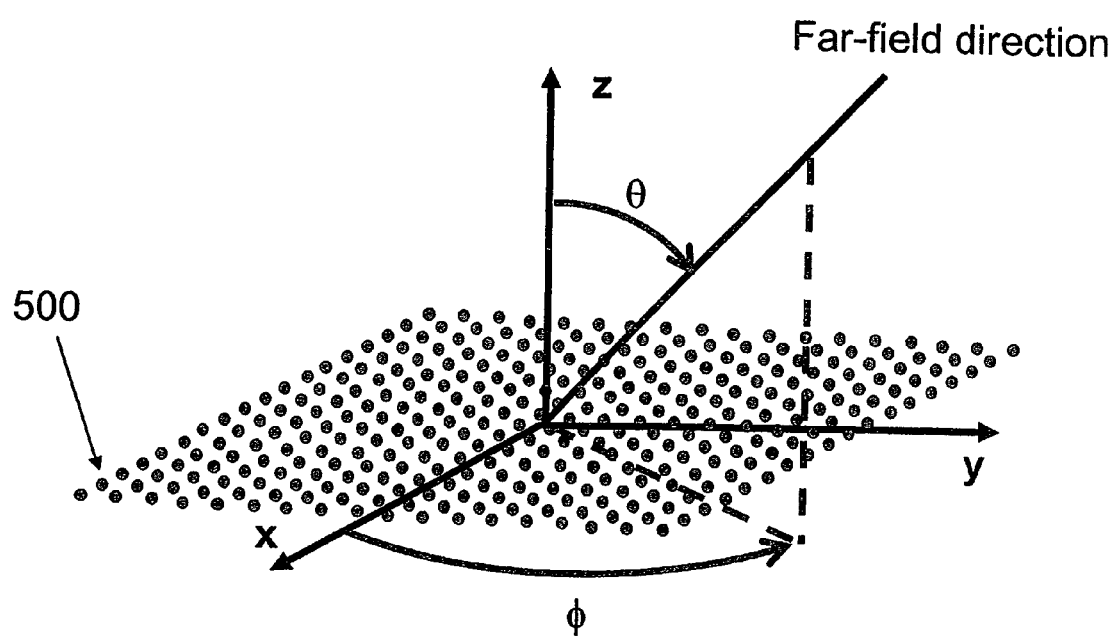
FIG. 12 illustrates a square planar array with 324 elements.
Figure 13:
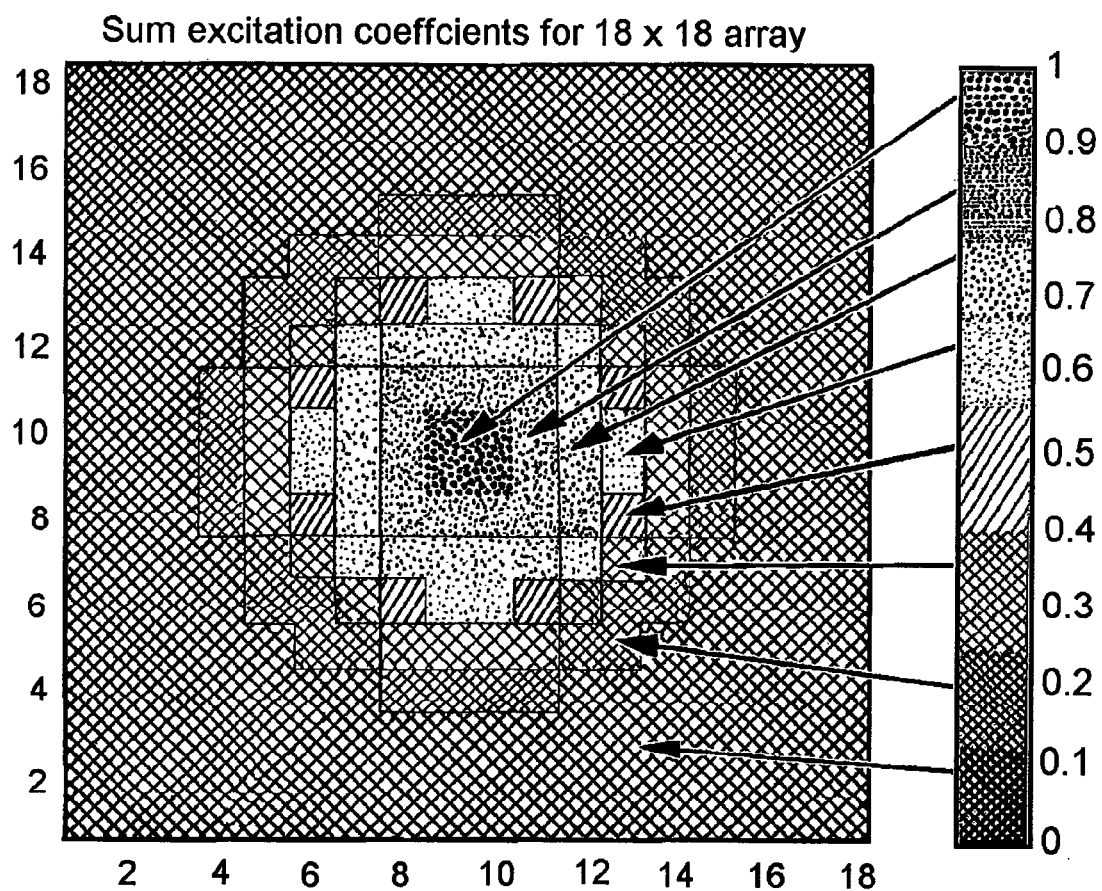
FIG. 13 illustrates a mapping of the array coefficients for the sum pattern of the 324-element planar array. The array coefficients can be used for both transmission and reception.
Figure 14:
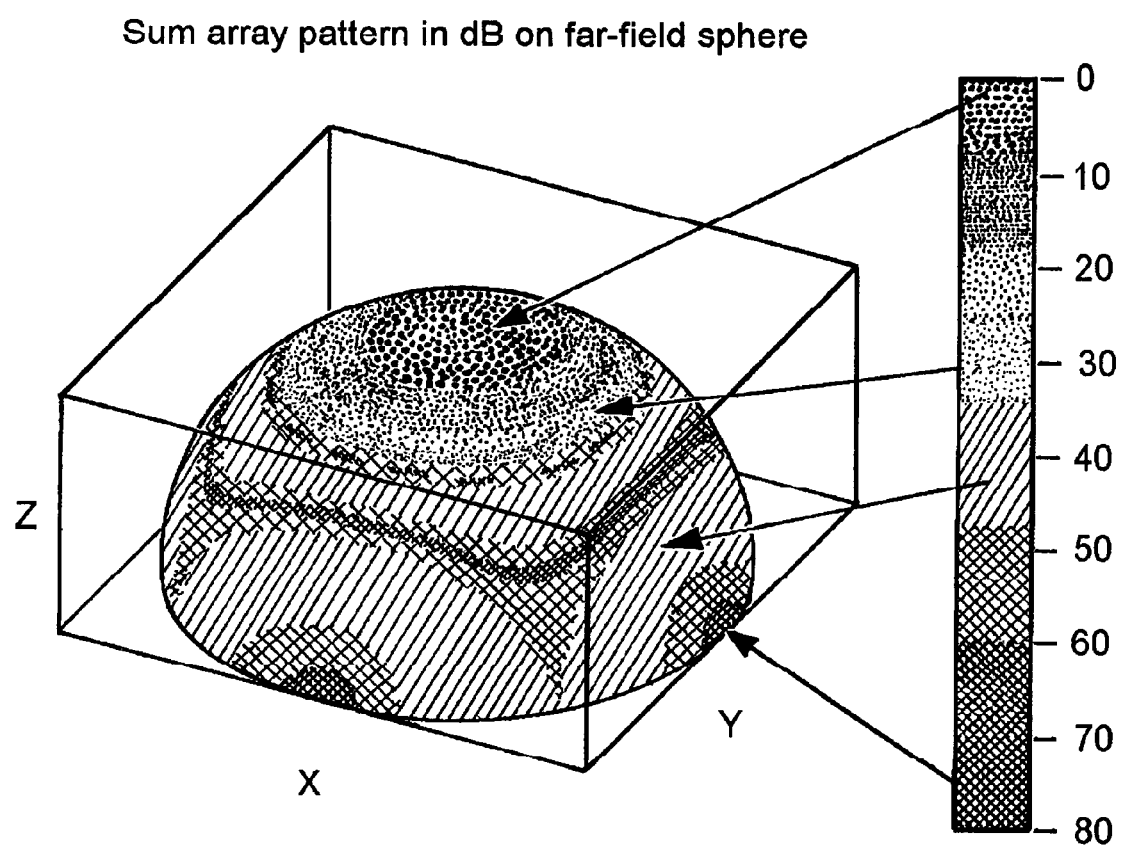
FIG. 14 illustrates a 3-D mapping of the array sum pattern corresponding to the array coefficients in FIG. 13.

FIG. 12 shows a 324-element planar array, having 18 elements by 18 elements. The element spacing is half a wavelength. FIG. 13 shows a typical set of sum excitation coefficients, and FIG. 14 shows the corresponding array sum pattern. The array pattern is almost independent of $\phi$ and has a main beam in the broadside direction. Standard methods can be used to steer the beam in any desired direction.

Figure 15:
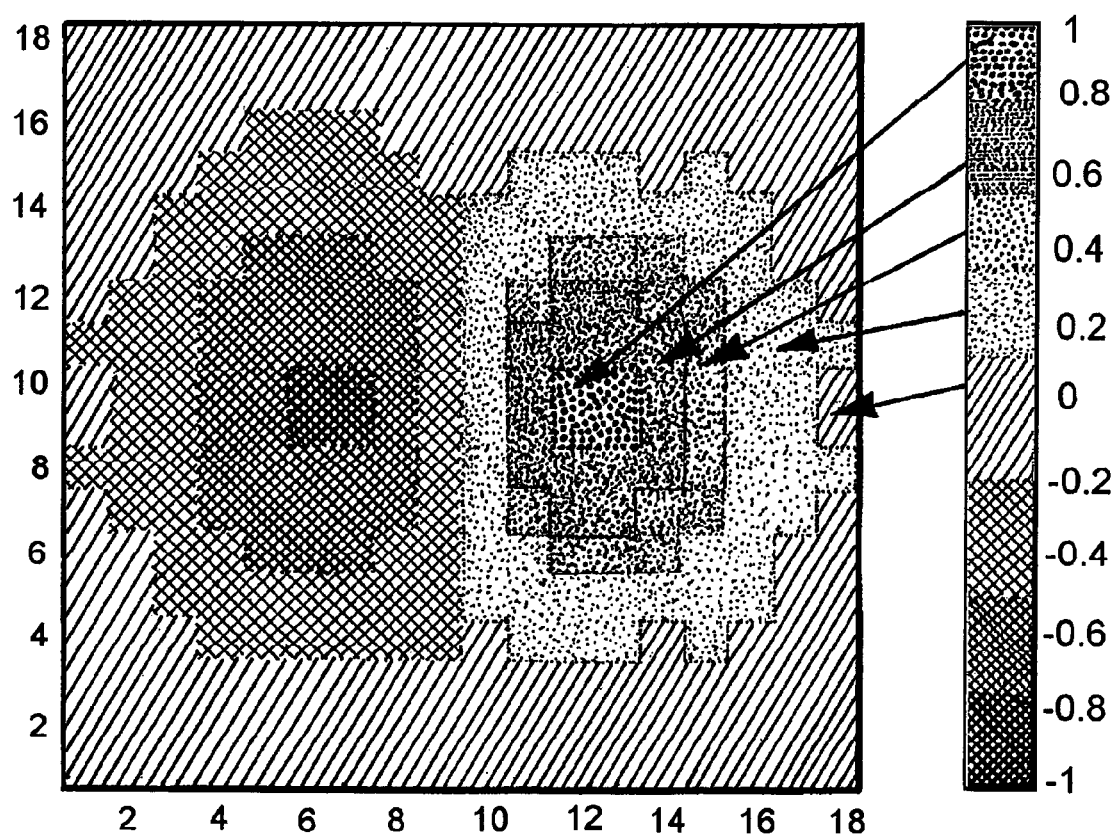
FIG. 15 illustrates a mapping of the array coefficients for the cosine difference pattern of the 324-element planar array. The array coefficients can be used for both transmission and reception.

For planar arrays, the difference patterns with sharp nulls have $\cos(\phi)$ or $\sin(\phi)$ angular dependence. The $\phi$ independent difference patterns for planar arrays result in a broadening of the angular regions in which the signals are intelligible. FIG. 15 shows a set of difference excitation coefficients with $\cos(\phi)$ angular dependence, and FIG. 16 shows the corresponding difference pattern.

The excitation coefficients for both the sum and difference patterns for the planar array may be obtained with semi-analytical methods to achieve desired side lobe levels and main beam widths. Alternatively, the excitation coefficients may be obtained with nonlinear optimization techniques. Indeed, the excitation coefficients shown in FIGS. 13 and 15 were obtained with the MATLAB™ function FMINUNC, which minimizes a user-defined cost function. The cost function is designed to ensure that the side lobes are below a certain level for all $\phi$.

Figure 16:
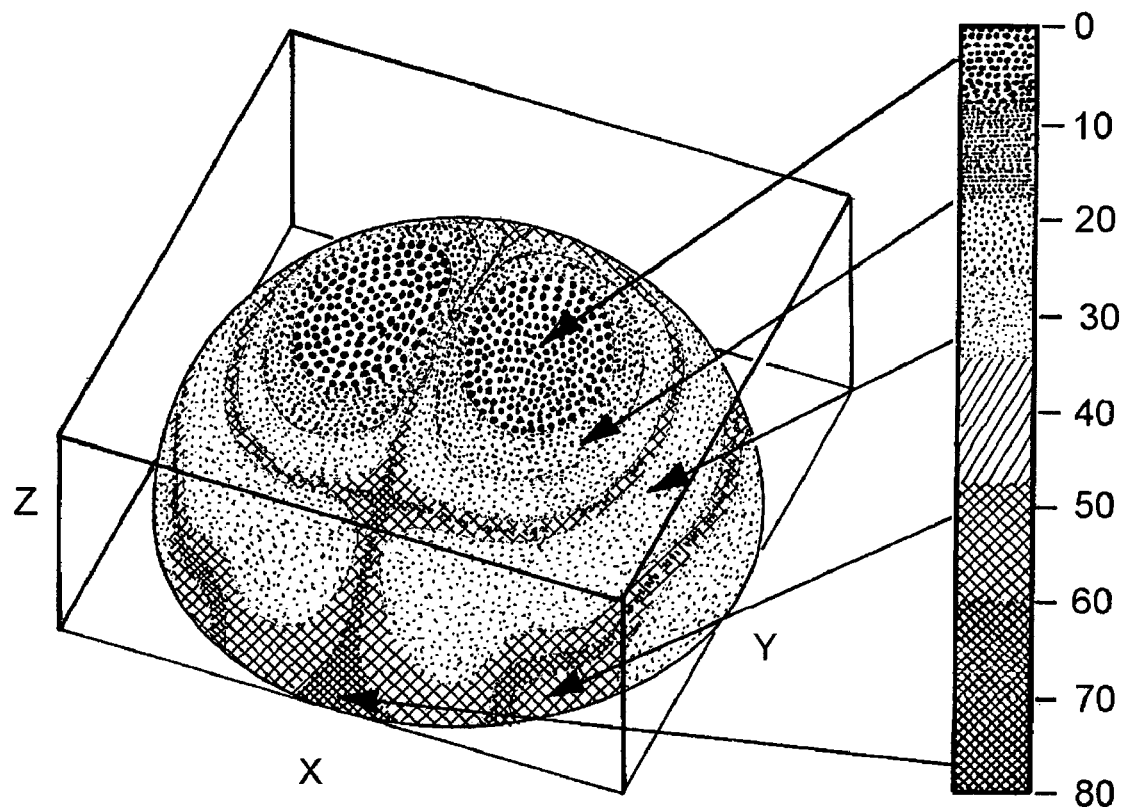
FIG. 16 illustrates a 3-D mapping of the array difference pattern corresponding to the array coefficients in FIG. 15.

The difference pattern as shown in FIG. 16 has a null for $\phi=90°$ and $\phi=270°$. Hence, with one scramble signal a secure transmission cannot be achieved if an eavesdropper is located at any observation point with $\phi=90°$ or $\phi=270°$. Therefore, at least two scramble signals are necessary for the planar array. The excitation coefficients and array pattern for a $\sin(\phi)$ difference pattern may be obtained by rotating the plots in FIGS. 15 and 16 ninety degrees around the z axis. To achieve a secure transmission in the direction $\theta=0°$, the, $\cos(\phi)$ or $\sin(\phi)$ difference patterns are combined and each array element is fed by the sum of three signals. Array element #p is thus fed by the signal:

$$T_p(t)=A_p a(t-\alpha_p)+B_p b(t-\beta_p)+C_p c(t-\chi_p)$$

where $B_p$ and $C_p$ are the excitation coefficients, $\beta_p$ and $\chi_p$ are time delays, and $b(t)$ and $c(t)$ are the scramble signals applied to the $\cos(\phi)$ and $\sin(\phi)$ difference patterns, respectively (p=1, 2, ... N). As before, $A_p$ (p=1, 2, ... N) are the excitation coefficients and $\alpha_p$ (p=1, 2, ... N) are the time delays for the data signal. With at least two independent scramble signals, one achieves a secure transmission that is only intelligible in a narrow region round $\theta=0°$. To steer the sum and difference beams in the same direction, one simply sets $\alpha_p=\beta_p=\chi_p$.

Other Antennas

Figure 17:
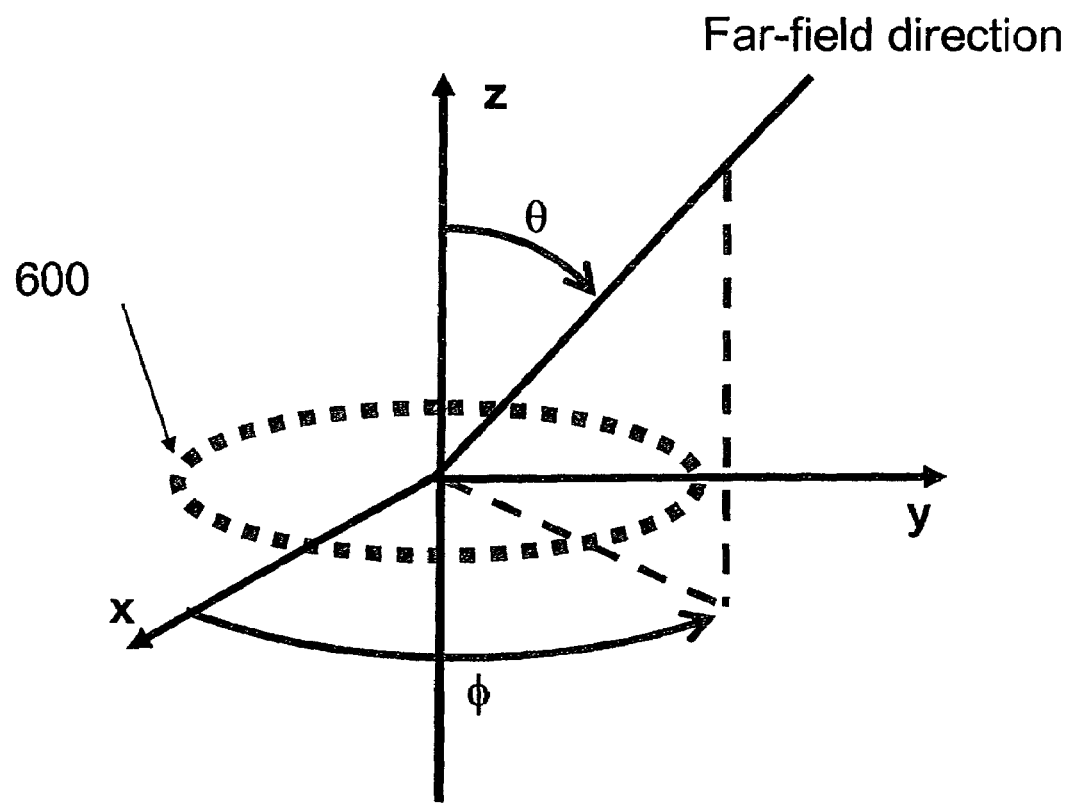
FIG. 17 illustrates a circular ring array.

Secure communication in accordance with the present invention can also be achieved with arrays that are neither linear nor planar. For example, a circular array, as shown in FIG. 17, may be used for providing 360° coverage. Secure transmission with a circular array type can be obtained by combining sum and difference patterns obtained from standard theory. Similar security measures can be realized with reflector antennas (FIG. 18) by applying the present invention to its feed, which is typically a smaller antenna located at the focal point. More generally, one may use the theory developed for any antenna type array configuration to obtain sum and difference patterns that can be combined to achieve secure transmissions, in accordance with this invention.

For purposes of illustration, the examples in this discussion have been limited to sum and difference patterns because such patterns have been studied extensively in the radar literature. However, secure transmissions in accordance with this invention can be achieved with any combination of array patterns in which one of the patterns, the scramble signal pattern, has a null in the direction of the intended receiver and is larger in magnitude than the data signal pattern in directions where eavesdroppers may be present.

In many applications, one antenna array must communicate with multiple users simultaneously. The present invention allows multiple secure transmissions from one antenna to occur simultaneously. For example, assume that a planar array needs to communicate with two receivers. The signals to be transmitted are $a_1(t)$ for receiver #1 and $a_2(t)$ for receiver #2. Element #p of the planar array is thus fed by the signal:

$$T_p(t) = A_{1p}a_1(t-\alpha_{1p}) + B_{1p}b_1(t-\beta_{1p}) + C_{1p}c_1(t-\chi_{1p}) + A_{2p}a_2(t-\alpha_{2p}) + B_{2p}b_2(t-\beta_{2p}) + C_{2p}c_2(t-\chi_{2p})$$

where the quantities with index 1 are chosen to create a secure transmission in the direction of receiver #1, and the quantities with index 2 are chosen to create a secure transmission in the direction of receiver #2. To minimize interference, one may choose the array excitation coefficients such that the beams are as narrow as possible. With this arrangement of two data signals and four scramble signals, an eavesdropper will not receive an intelligible signal unless located in a direction close to either receiver #1 or receiver #2. Moreover, receiver #1 will not be able to understand what is transmitted to receiver #2, and receiver #2 will not be able to understand what is transmitted to receiver #1. This procedure may easily be extended to more than two receivers. The beams can be steered toward receiver #1 and receiver #2 by setting $\alpha_{1p} = \beta_{1p} = \chi_{1p}$ and $\alpha_{2p} = \beta_{2p} = \chi_{2p}$.

The difference patterns must be slightly broader than the sum patterns to achieve the physical layer of security. The numerical examples provided here have demonstrated that difference patterns can be designed to have beam widths that are just slightly broader than the beam widths of the corresponding sum patterns. Hence, the beam width of the total radiation pattern for the secure transmission is almost as narrow as the beam width for the corresponding insecure transmission.

Secure Perimeter

In the examples above, the information was transmitted into a narrow angular region. Consider an application where the information is transmitted into a wide angular region where multiple receivers may be present. This scenario occurs when eavesdroppers are present outside a building in which all users are trusted. Everyone inside the building is allowed access to the information, whereas everyone outside the building is an eavesdropper.

Figure 19:
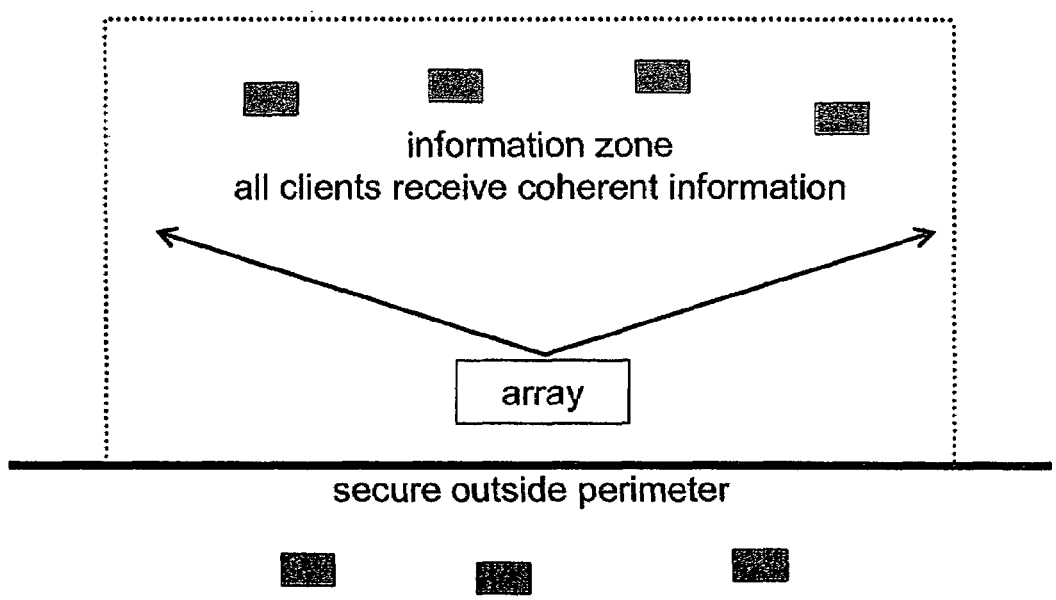
FIG. 19 illustrates the secure perimeter set up.

The schematic in FIG. 19 shows how one can prevent eavesdroppers outside a perimeter from accessing the information. FIG. 19 shows only a segment of a perimeter. Security around a closed perimeter can be achieved by placing several such arrays at points on that perimeter. In FIG. 19, the array placed near the perimeter is driven by a data signal that contains the information and a scramble signal. Both signals are broadcast with a sum beam. By beam steering, the information is broadcast into the region enclosed by the perimeter and the scramble signal is broadcast to the outside.

Figure 20:
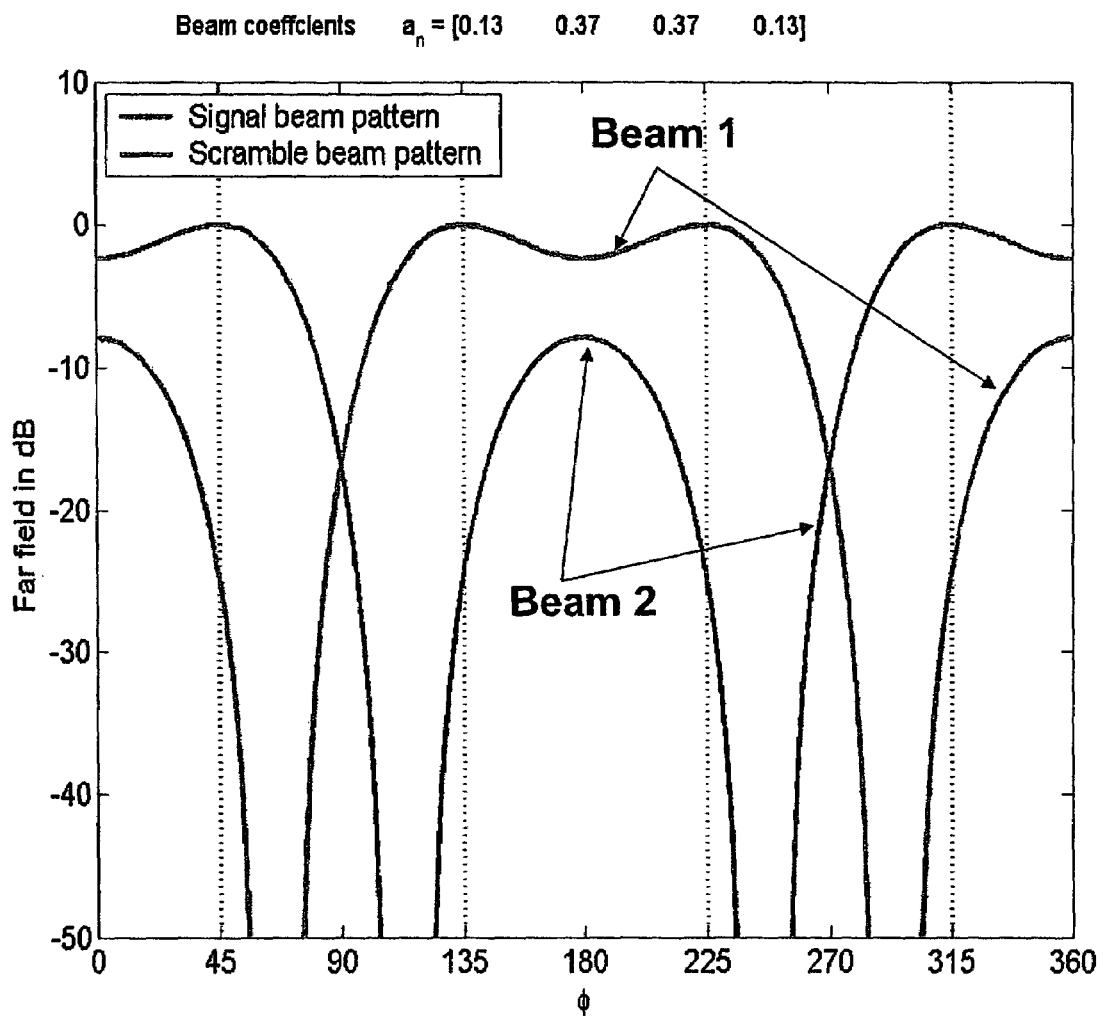
FIG. 20 illustrates two sum patterns for a 4-element array for secure-perimeter applications. Both beams use the array coefficients shown on top. The two beams are steered in different directions.
Figure 21:
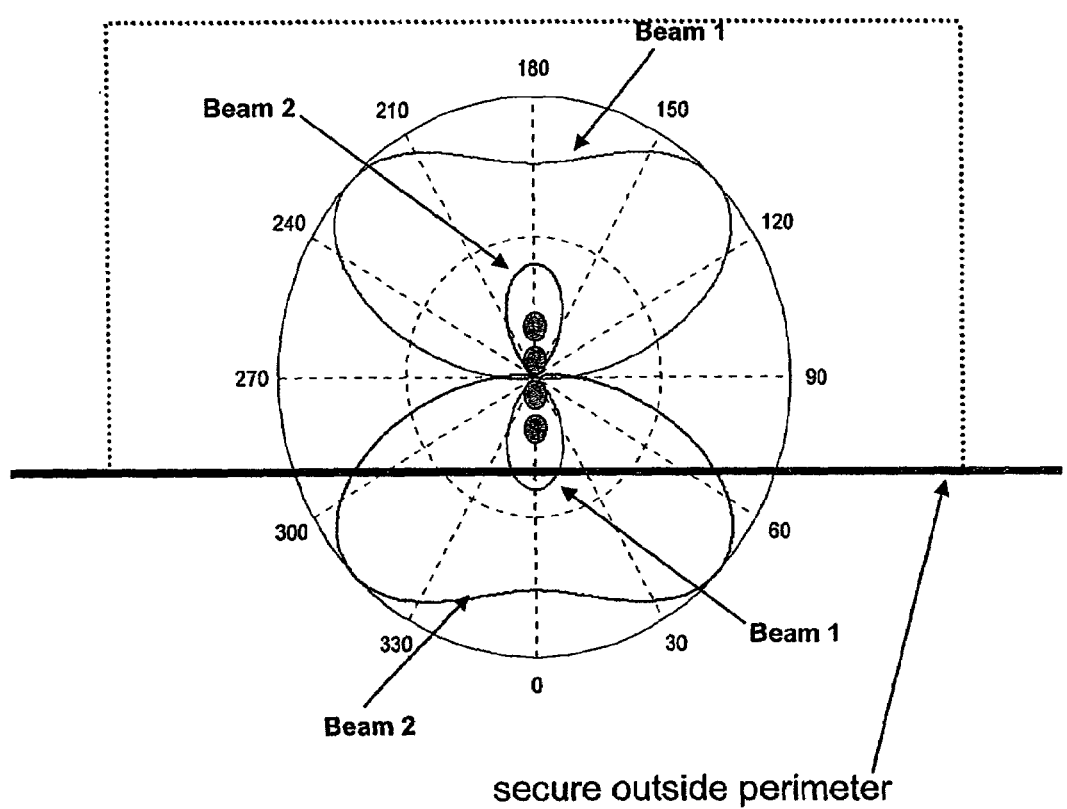
FIG. 21 illustrates a polar plot of the two sum patterns for a 4-element array for secure-perimeter applications.

FIG. 20 shows two sum beams for a 4-element array operating at 2.4 GHz with 5.6 cm element spacing. The array coefficients are also shown in FIG. 20. FIG. 21 shows the same beams as a polar plot superimposed on a schematic of the perimeter. Beam 1 containing the data is stronger than Beam 2 containing the scramble signal in a wide angular sector that points into the region enclosed by the perimeter, and Beam 1 is weaker than Beam 2 in a wide angular sector that points out of the region enclosed by the perimeter. Hence, a user inside the perimeter gets the information, whereas an eavesdropper outside the perimeter gets the scramble signal. Reflections from walls and other barriers can be taken into account by adjusting the signal amplitudes and directions of the two beams, as is well known by a person skilled in the art.

Steering Information to Different Users

As seen from FIG. 5, the signal transmitted by the 18 element array in FIG. 1 contains the data bits (called the "transmitted" bits in FIG. 5) in the narrow six-degree region around $\phi = 90°$. Outside this narrow region, the transmitted signal contains the scramble bits. The data bits are transmitted with the sum beam and the scramble bits are transmitted with the difference beam.

Alternatively, one could encode the sum beam with a first data set intended for users in the narrow region and encode the difference beam with a second data set intended for users outside this narrow region. For example, the data set encoded in the difference beam could contain information on network status. More generally, one could employ multiple sum and multiple difference beams to transmit multiple data streams into user-specified angular regions. In this way, multiple information streams could be steered in multiple directions. The steep lobes of the difference beams centered on the null enable one to transmit data with a sum beam into a very narrow angular region.

Precise Location of Transceivers

A secure beam obtained by combining a sum beam and one or more difference beams as described above can be used to efficiently and accurately determine the positions of transceivers within range. The transceivers are not required to transmit secure beams. For example, the transceivers could be laptop computers in a wireless network or RFID tags. Their positions are determined as follows:

A secure-beam antenna (for example, a base station in a wireless network or an RFID reader) scans the angular regions in which transceivers may be present. The bits transmitted by the sum beam are encoded with information about the current scan angle. The difference beams ensure that the information encoded in the sum beam is intelligible only in a narrow angular region for each scan angle. A transceiver records the bits transmitted by the secure-beam antenna and at an appropriate time transmits those bits along with a transceiver-id number back to the secure-beam antenna (or to another receiver). In other words, the transceiver sends back information about its own location obtained from the data in the incoming secure beam.

Depending on the width of the intelligible signal region and the scan angle increments, a transceiver may receive the intelligible information in the sum beam at more than one scan angle. Since the width of the intelligible signal region can be made very small, a precise location of the transceivers may be obtained without having to perform any processing steps. The secure-beam antenna can also determine and record the quality (i.e., loss) of the propagation paths associated with each scan angle. Thus, a database can be generated with transceiver positions and propagation-path quality for each transceiver at each scan angle.

For some RFID applications, the sum beam does not need to contain scan-angle information. Instead, one can design the reader and tags such that the tags respond only to the signal in the sum beam and not to the signal in the difference beam. Hence, by pointing the reader to a collection of tags, one excites only those tags that are located in the narrow region that receive the signal encoded by the sum beam.

The Receiving Process

Figure 22:
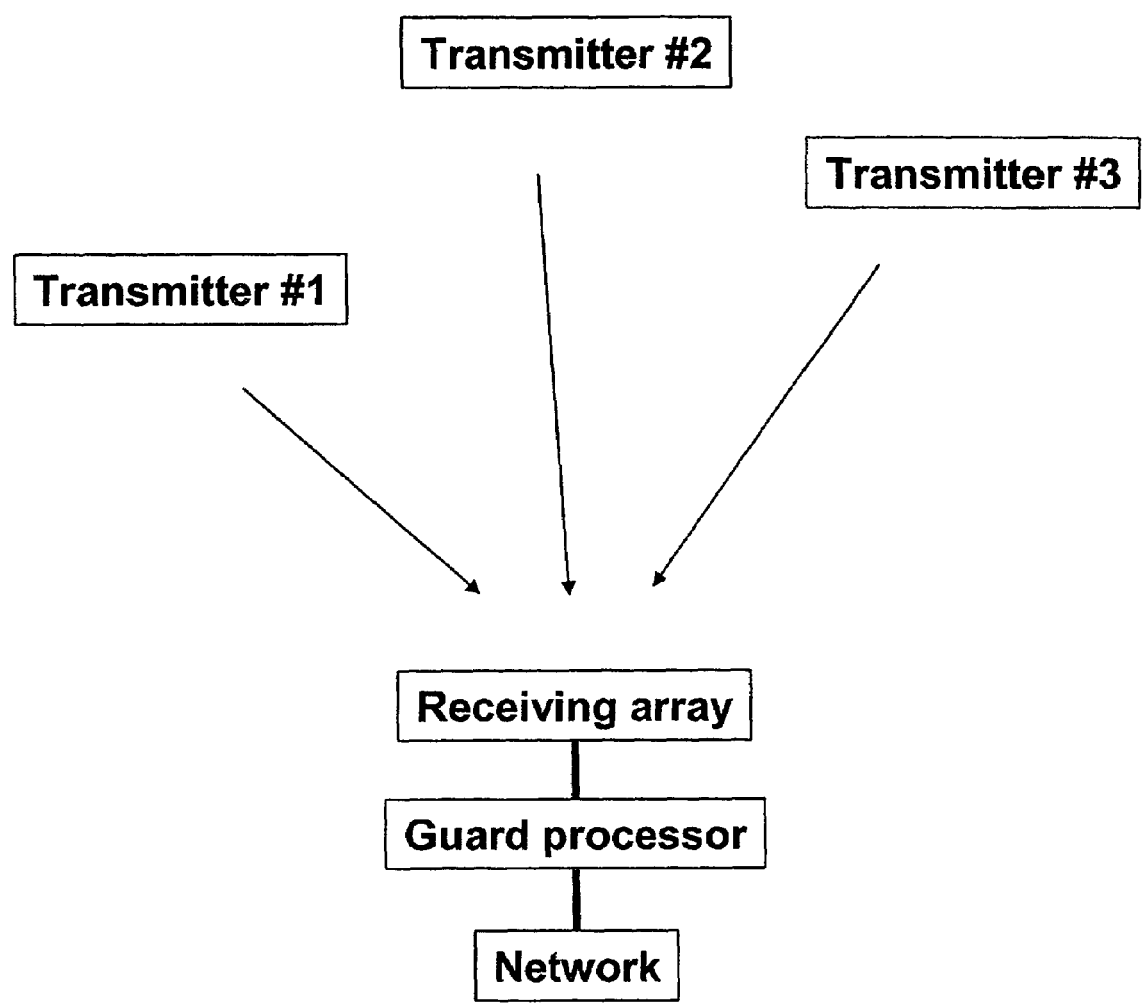
FIG. 22 is a block diagram of a secure receiving array in the presence of transmitters, having a guard processor to determine which data streams come from legitimate transmitters and may pass to the network.

The secure radio receiver in FIG. 22 consists of a receiving array of antennas that is connected to a network through a guard processor. The guard processor is the main component of the invention and will be described in greater detail below. Transmitters attempting to access the network are also shown in FIG. 22. Not all of these transmitters are authorized to access the network, and the guard processor prevents unauthorized transmitters from gaining access.

For purposes of illustration, assume that the array of antennas has N elements and $u_p(t)$ represents the output of element #p. The output depends on the transmitters, the chosen modulation and coding techniques, and on the transfer functions of the array elements. The present invention works for any modulation and coding techniques and for any set of array elements. If multiple transmitters broadcast simultaneously, $u_p(t)$ is a weighted and time shifted sum of contributions from each transmitter.

The individual element outputs are combined into a single array output according to the following equation:

$$U(t) = \sum_{p=1}^{N} H_p u_p(t - t_p)$$

where $H_p$ represents real receiving coefficients and $t_p$ represents time shifts. The equation sums the individual element outputs from p=1 to N. The output U(t) depends on $H_p$ and $t_p$. More generally, before computing U(t), one could correct each $u_p(t)$ for array imperfections, end-element effects, or array elements differences. One working in this area would be familiar with making such corrections. Therefore, in this description, one may simply use the outputs $u_p(t)$ to compute U(t).

According to the present invention, the guard processor employs different sets of receiving coefficients $H_p$ to compute different total outputs U(t). By comparing the energy of the total outputs, the guard processor ensures that only authorized transmitters from certain selected directions gain access to the network, regardless of the signal strengths. This process may be explained by example for linear arrays such as the 18-element array shown in FIG. 23.

Linear Arrays

Figure 23:
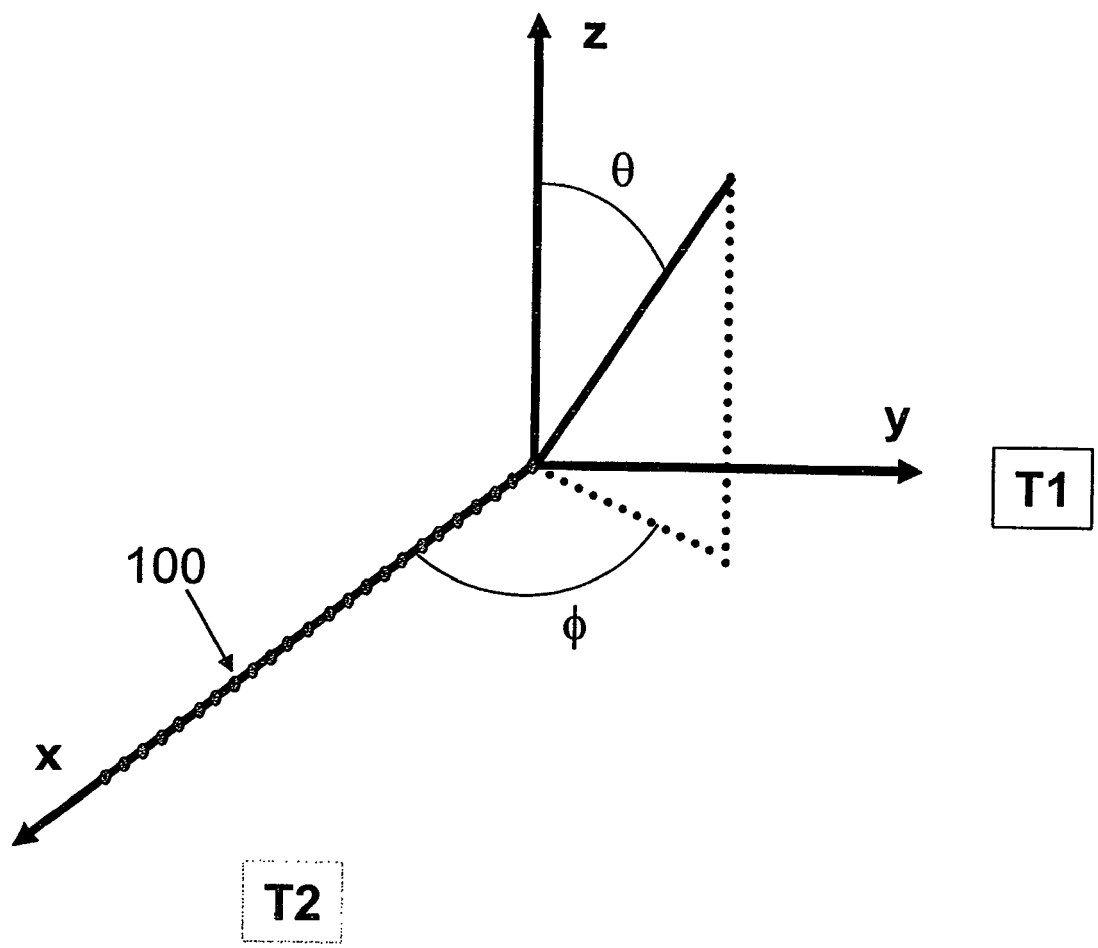
FIG. 23 illustrates a secure 18-element array in the presence of two transmitters T1 and T2 located in the x-y plane.

Assume for this example that the transmitter T1 in FIG. 23 is authorized to access the network, whereas T2 is not authorized to access the network. Both transmitters are in the plane θ=90°. As is well known, in standard operation, one would form the total time-domain output according to the following equation:

$$U_A(t) = \sum_{p=1}^{N} A_p u_p(t),$$

where $A_p$ represents the receiving coefficients. Since T1 is at φ=90°, all of the time delays are zero. The receiving coefficients are determined by standard methods to achieve a desired receiving pattern.

A typical receiving pattern and the associated coefficients are illustrated in FIG. 2 for the 18-element linear array shown in FIG. 23. The element spacing is equal to half a wavelength. All time delays are zero, such that the array operates in broadside mode. Since all the receiving coefficients have the same sign, the array receives with a sum pattern, which is characterized by a main beam and some side lobes that are below a certain level (–55 dB in this case). The receiving beam may be steered by assigning nonzero values to the time delays, as is well known to those working in this area. $U_A(t)$ designates the sum output.

The receiving beam in FIG. 2 points towards T1, such that the array boosts signals coming from the direction of T1 and attenuates signals coming from the direction of T2. For example, if T2 is at φ=42°, where the sum pattern is at –60 dB, the amplitude of the signal from T2 must be 60 dB larger than the amplitude of the signal from T1, in order for the two transmitters to contribute equally to the output $U_A(t)$. If the signal from T2 is 70 dB greater than the signal from T1, for example, the output $U_A(t)$ will approximately equal the signal from T2 and unauthorized transmitter T2 would gain access to the network.

To prevent unauthorized transmitter T2 from gaining access to the network, a difference pattern, as shown in FIG. 3, may be employed. The difference pattern has a deep null in the center, surrounded by two steep peaks. The term "difference pattern" originates from the fact that half of the receiving coefficients are positive and the other half negative. The time delays as shown in FIG. 3 are all zero. As discussed previously, beam steering can be achieved by assigning nonzero values to the time delays.

All the zeros of the difference pattern, except the center zero at φ=90°, have been moved off the Schelkunoff unit circle to ensure that the magnitude of the difference pattern is larger than the magnitude of the sum pattern throughout the angular regions 0°<φ<87° and 93°<φ<180°. As a consequence, the receiving coefficients for the difference pattern are not asymmetric around the center of the array. The sum of these coefficients, however, still equals zero.

The output related to the difference pattern is computed according to the following equation:

$$U_B(t) = \sum_{p=1}^{N} B_p u_p(t)$$

where $B_p$ represents the difference pattern coefficients. The difference pattern has a null in the direction of T1, so that $U_B(t)$ will never equal the signal transmitted from T1. For the configuration shown in FIG. 23, the difference pattern is at –50 dB at T2's location φ=42°. $U_B(t)$ designates the difference output.

FIG. 4 shows both the sum and the difference patterns. The difference pattern is greater in magnitude than the sum pattern everywhere except in a narrow region around φ=90°. This observation indicates that the energies of $U_A(t)$ and $U_B(t)$, measured during an appropriate time interval in which T1 transmits, can be used to determine if $U_A(t)$ actually contains the information transmitted by T1. The energy of $U_A(t)$ and $U_B(t)$ is noted over the selected time interval by $E_A$ and $E_B$, respectively. The MAC protocol ensures that any other authorized transmitter is silent when T1 transmits, so that the receiver only has to discriminate between T1 and an unauthorized transmitter such as T2. The guard processor performs the following comparison:

If $E_A > E_B$, then the information in the sum output $U_A(t)$ equals the information transmitted by T1, and this information is passed on to the network.

If $E_A < E_B$, then the sum output $U_A(t)$ may contain the information transmitted by T2, and access to the network is denied.

Applying this approach to the configuration shown in FIG. 23, the sum pattern is 10 dB lower than the difference pattern at the location $\phi = 42°$ of the unauthorized transmitter T2, and the contribution from T2 to $U_A(t)$ is 10 dB weaker than the contribution from T2 to $U_B(t)$. Because T1 does not contribute to $U_B(t)$, the condition $E_A > E_B$ can only be achieved if T1's contribution to $U_A(t)$ is on the order of 10 dB greater than T2's contribution. In this case, using the configuration shown in FIG. 23, T2's contribution to $U_A(t)$ is completely overshadowed by T1's contribution, so $U_A(t)$ contains only the information of T1 and access to the network may be granted.

According to this example, the sum pattern should be at least a couple of dB below the difference pattern outside the region of the authorized transmitter. If the levels of the sum pattern and difference patterns are too close at certain angles, one may simply raise the level of the difference pattern by increasing the magnitudes of the coefficients $B_p$.

EXAMPLE 2

Figure 24:
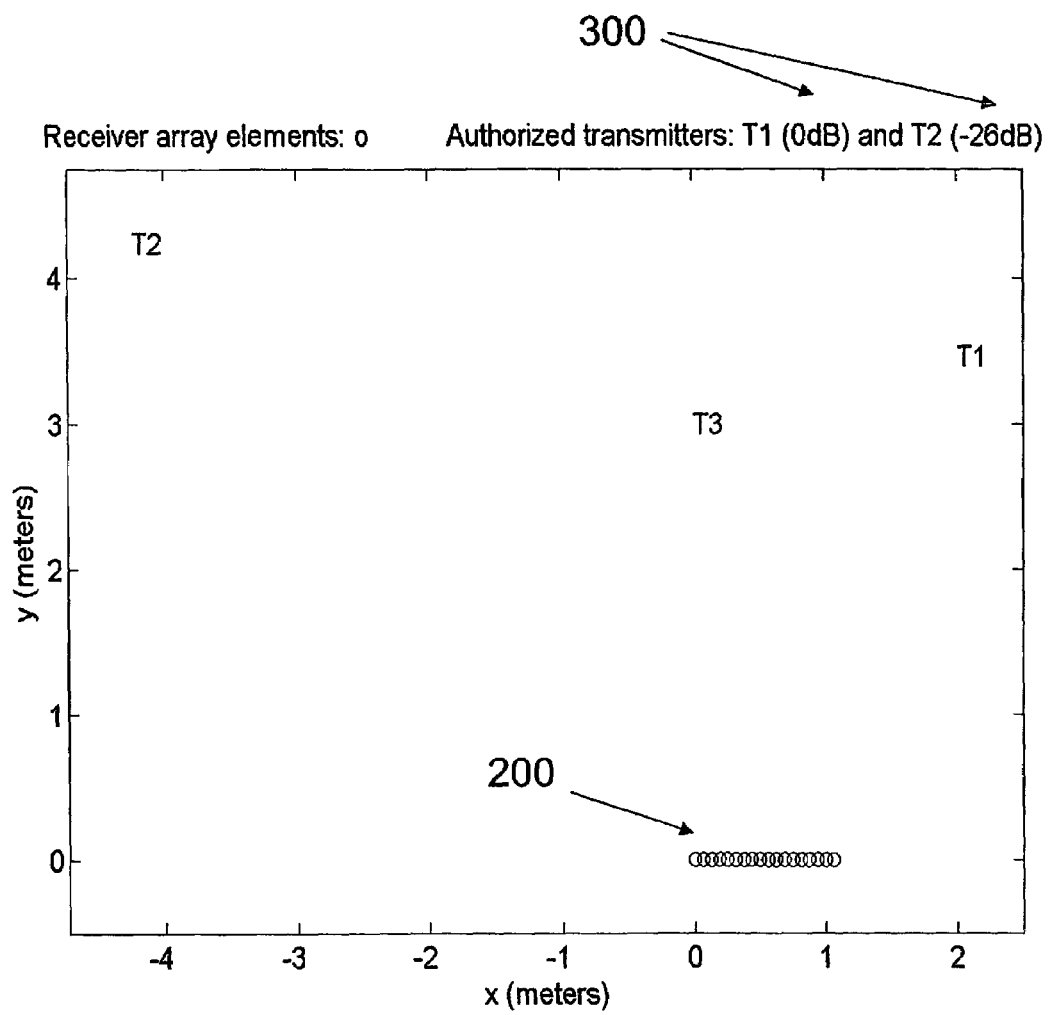
FIG. 24 illustrates an 18-element linear array operating at a center frequency around 2.4 GHz, with authorized and unauthorized transmitters present.

For this example, assume, in a complicated time-domain simulation, that the 18-element linear array in FIG. 23 operates at a center frequency of approximately 2.4 GHz. Then the element spacing is 6.25 cm and the distance between the end elements is 106.25 cm. Three transmitters are present in the plane $\theta = 90°$ as shown in FIG. 24. T1 and T2 are authorized transmitters, and T3 is an unauthorized transmitter. The transmitters have different excitation amplitudes and the signals exhibit 1/r decay. All of the transmitters broadcast simultaneously and the signals are coded with differential phase shift keying. Each bit uses 1000 periods of a 2.4 GHz sine wave.

Figure 25:
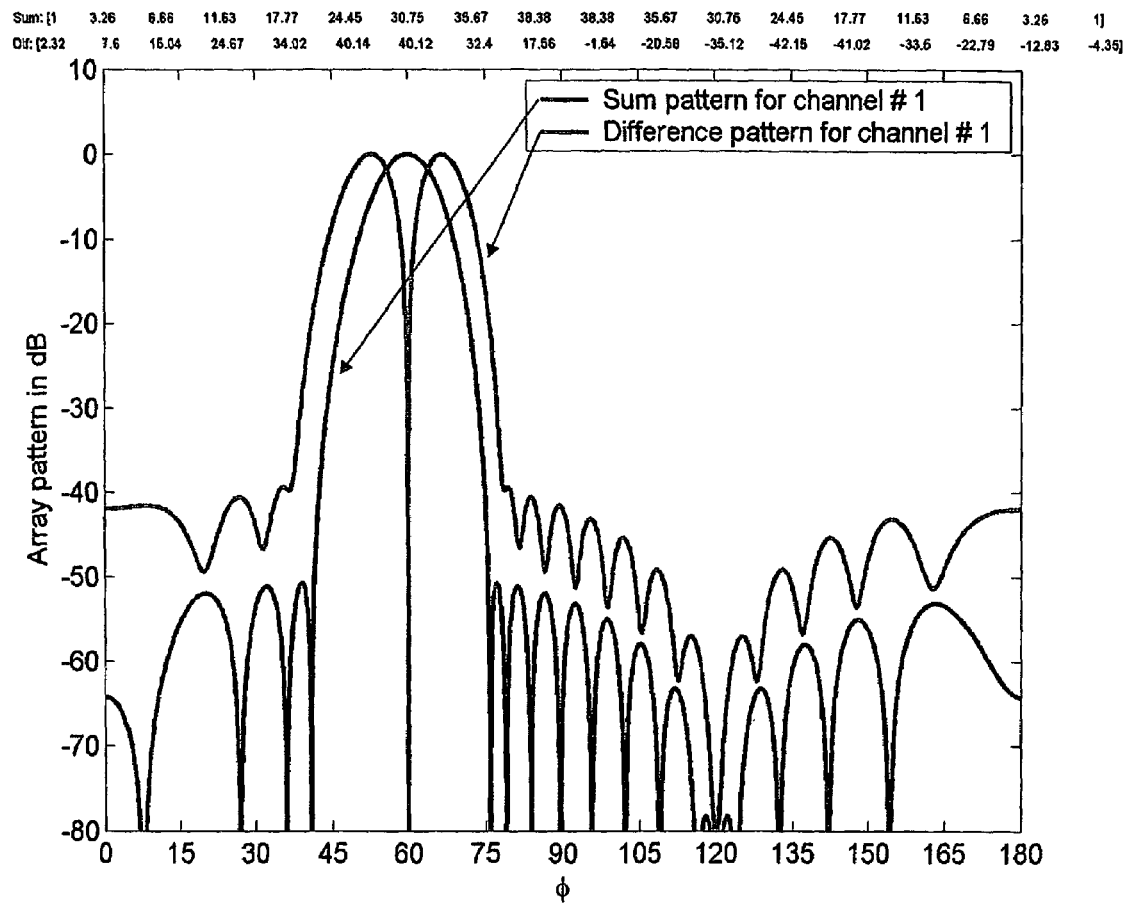
FIG. 25 illustrates the sum and difference beams pointing towards T1, an authorized transmitter.
Figure 26:
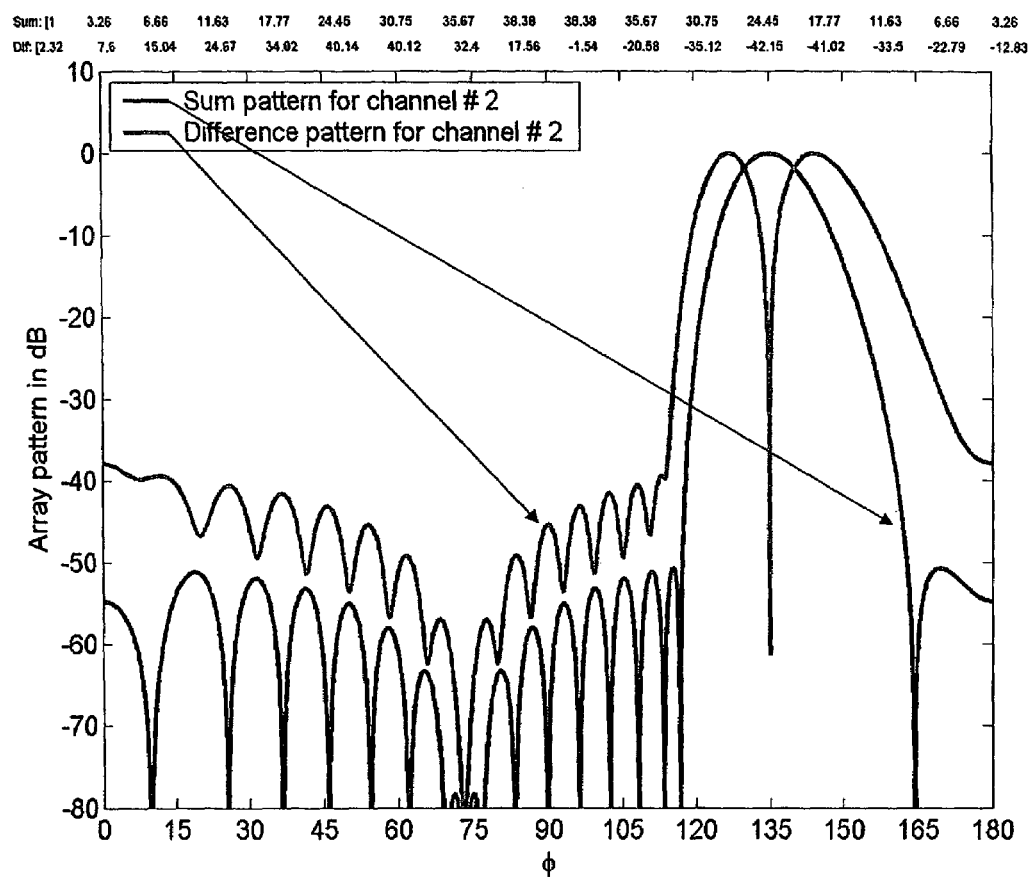
FIG. 26 illustrates the sum and difference beams pointing towards T2, an authorized transmitter.

When two authorized transmitters broadcast simultaneously, two sets of sum and difference beams are necessary. These beams point towards T1 and T2, as shown in FIGS. 25 and 26. The sum output for channel #1 is defined according to the following equation:

$$U_{AI}(t) = \sum_{p=1}^{N} A_p u_p(t - t_{pI})$$

and the difference output for channel #1 is defined according to the following equation:

$$U_{BI}(t) = \sum_{p=1}^{N} B_p u_p(t - t_{pI}),$$

where $A_p$ and $B_p$ represent the sum and difference receiving coefficients, and $t_{p1}$, represents time shifts that steer the beams toward T1. The sum and difference outputs for channel #2 are defined similarly with time shifts $t_{p2}$ that steer the beams towards T2.

As described above, the information is obtained from the sum outputs. The difference outputs are used in the energy comparison that determines if access to the network should be granted. Each sum output receives contributions from all three transmitters, whereas each difference output receives contributions from only two of the three transmitters. For example, the difference output for channel #1 does not receive T1, according to the earlier discussion.

In the example, the bits transmitted by the three transmitters are:

T1: [1 1 0 1 1 0 0 0 0 1 0 1 0 0 1],
T2: [1 0 1 0 0 1 1 1 1 0 1 0 1 1 0], and,
T3: [1 1 1 1 1 1 1 1 1 1 1 1 1 1 1].

The received bits are computed in the following way: First, the instantaneous phase of the total array output is computed with the Hilbert transform. Second, for each bit transmission period (1000 periods of the 2.4 GHz sine wave) a center phase is defined as the value of the instantaneous phase at the center of that transmission period. Finally, the received bit is set to one if the difference between the current and previous center phase is larger than 180° and the received bit is set to zero if the difference between the current and previous center phase is smaller than 180°.

Figure 27:
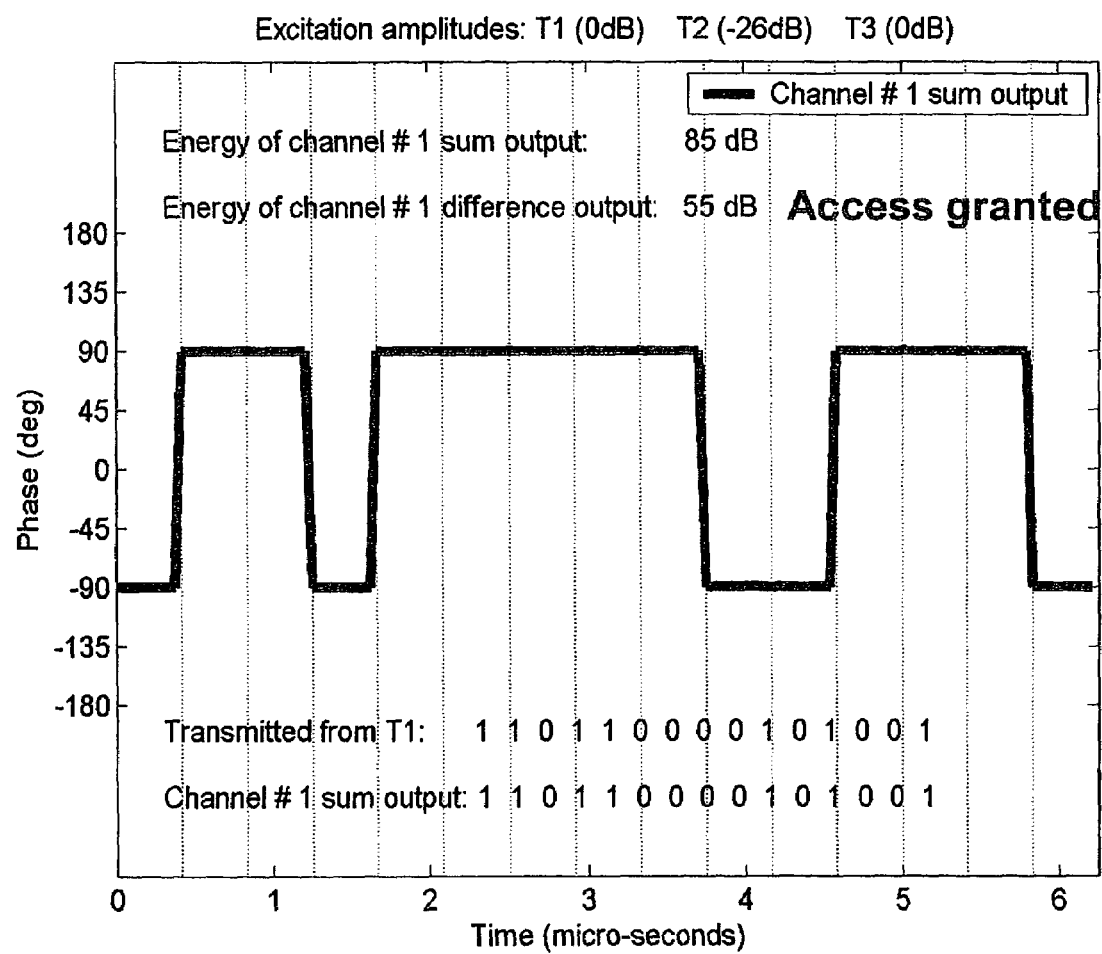
FIG. 27 illustrates the instantaneous phase of the sum output, the extracted bits, and the sum and difference energies for channel #1 when the excitation amplitude of T3 is 0 dB.

The excitation amplitudes for T1 and T2 are maintained at 0 dB and −26 dB, respectively. First, consider channel #1. FIG. 27 shows the instantaneous phase of the sum output, the extracted bits, and the sum and difference pattern energies when the excitation amplitude of T3 equals 0 dB. The energy of the sum pattern output is 30 dB greater than the energy of the difference pattern output, so access to the network is granted. The bits extracted from the sum pattern output are the bits transmitted from T1.

Figure 28:
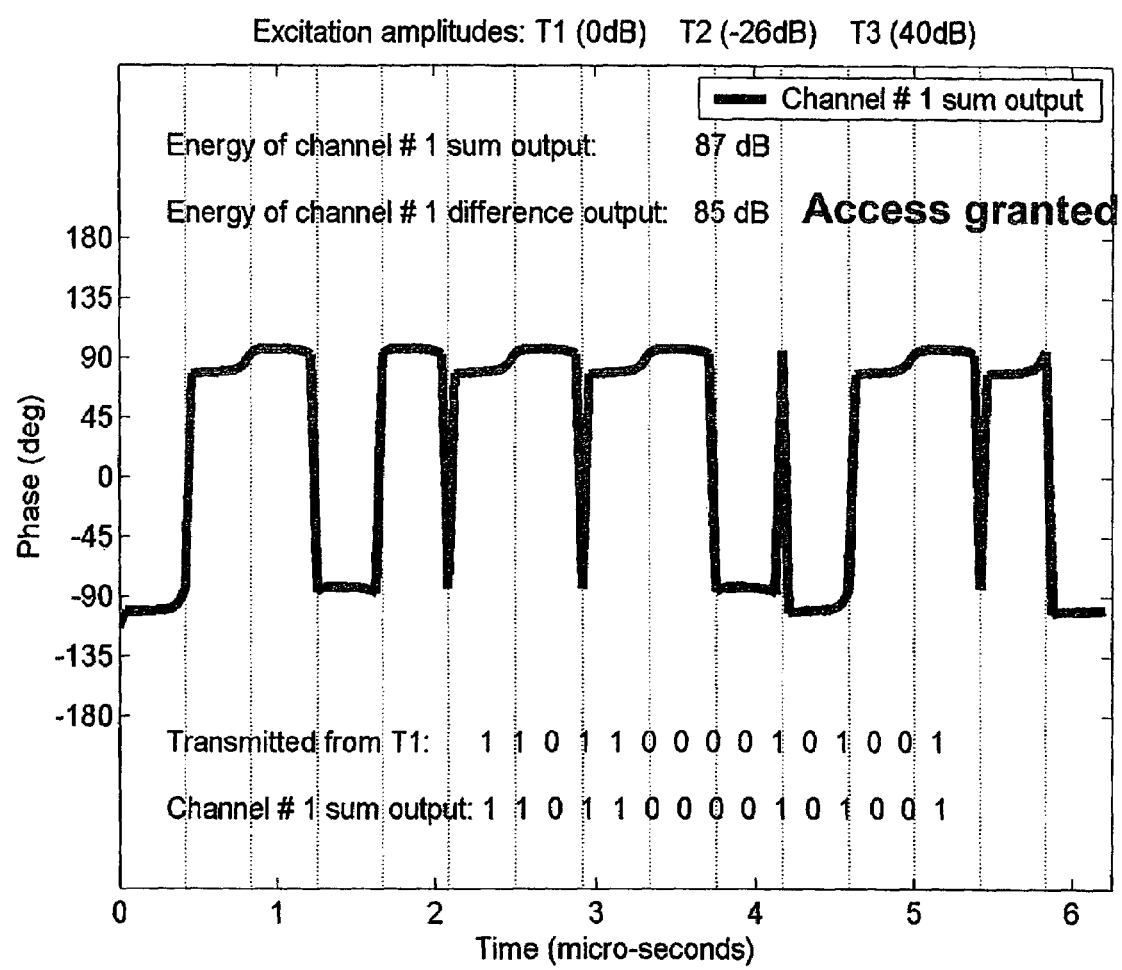
FIG. 28 illustrates the instantaneous phase of the sum output, the extracted bits, and the sum and difference energies for channel #1 when the excitation amplitude of T3 is 40 dB.

The excitation amplitude of T3 is 40 dB in FIG. 28. The sum pattern energy is greater than the difference pattern energy, and the extracted bits are the bits sent by T1. It is the high directivity of the sum pattern beam that allows correct reception of the transmission from T1 in the presence of the strong signal from T3.

Figure 29:
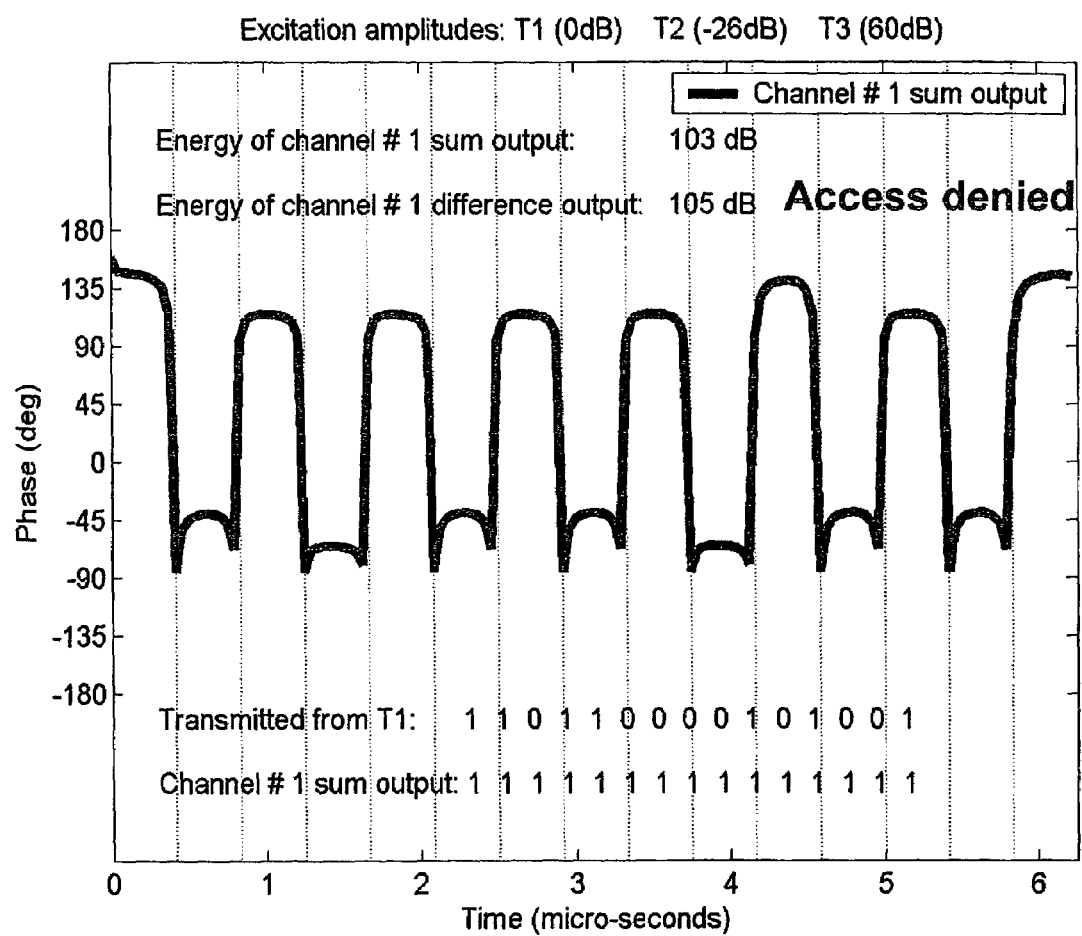
FIG. 29 illustrates the instantaneous phase of the sum output, the extracted bits, and the sum and difference energies for channel #1 when the excitation amplitude of T3 is 60 dB.

The excitation amplitude of T3 is 60 dB in FIG. 29, and the sum pattern energy is less than the difference pattern energy, so access to the network is denied. The extracted bits are those transmitted by the unauthorized transmitter T3. Hence, the unauthorized transmitter T3 would have gained access to the network if the method of the present invention were not employed.

Figure 30:
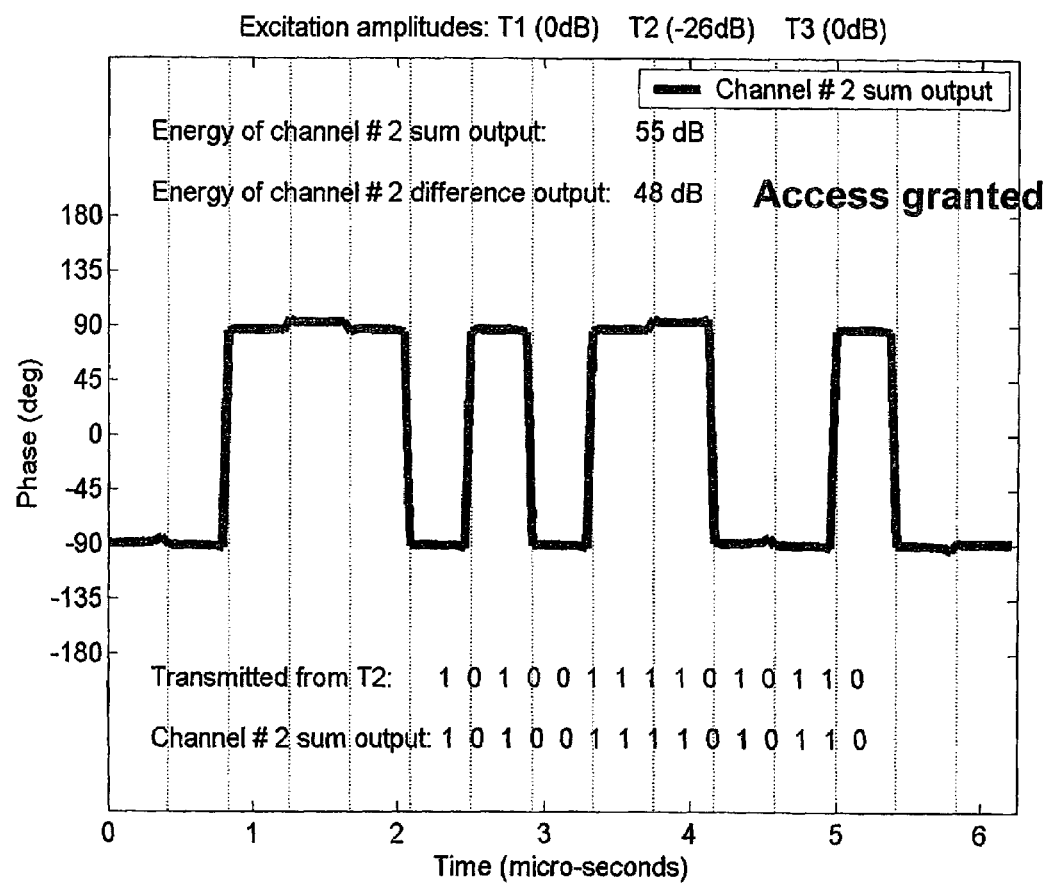
FIG. 30 illustrates the instantaneous phase of the sum output, the extracted bits, and the sum and difference energies for channel #2 when the excitation amplitude of T3 is 0 dB.
Figure 31:
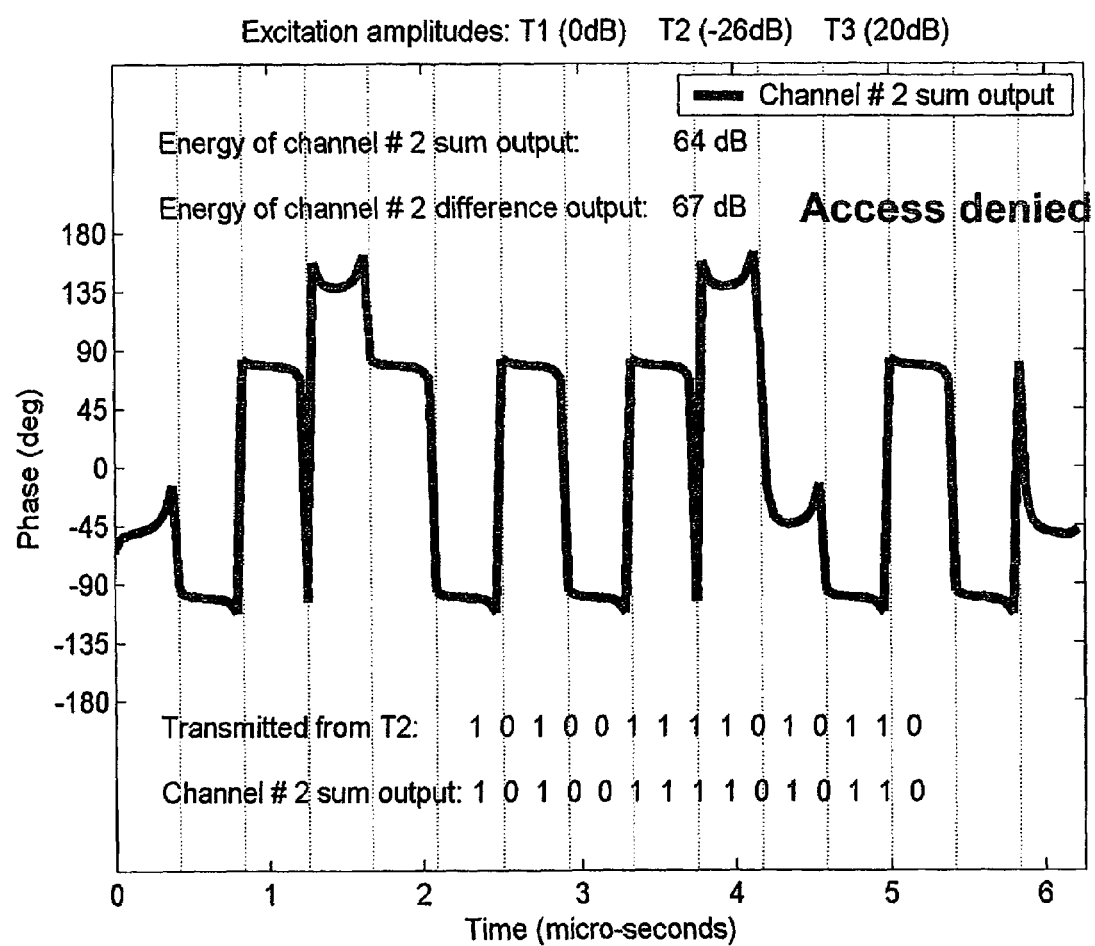
FIG. 31 illustrates the instantaneous phase of the sum output, the extracted bits, and the sum and difference energies for channel #2 when the excitation amplitude of T3 is 20 dB.

FIGS. 30 and 31 show the outputs of channel #2 for the cases where the excitation amplitude of T3 equals 0 dB and 20 dB, respectively. Since T2 is weaker than T1, access is granted only when the excitation amplitude of T3 is 0 dB. As shown in FIG. 31, the correct bits transmitted from T2 are extracted, but the sum pattern energy is less than the difference pattern energy and access is denied. The instantaneous phase is strongly affected by T3, however, so it is appropriate to deny access.

Planar Arrays

The present invention may also be used with planar arrays such as the 324-element array (18 elements by 18 elements) shown in FIG. 12. The element spacing is half of a wavelength. FIG. 13 shows a typical set of sum receiving coefficients, and FIG. 14 shows the corresponding array sum pattern. The array pattern is almost independent of $\phi$ and has a main beam in the broadside direction. Standard methods, as previously noted, can be used to steer the beam in any desired direction.

For planar arrays, the difference patterns with sharp nulls have $\cos(\phi)$ or $\sin(\phi)$ angular dependence. FIG. 15 shows a set of difference receiving coefficients with $\cos(\phi)$ angular dependence, and FIG. 16 shows the corresponding difference pattern.

The receiving coefficients for both the sum and difference patterns for the planar array may be obtained with semi-analytical methods to achieve prescribed side lobe levels and main beam widths. Alternatively, the coefficients may be obtained with nonlinear optimization techniques. The coefficients as shown in FIGS. 13 and 15 were obtained with the MATLAB™ function FMINUNC, which minimizes a user-defined cost function. The cost function is designed to ensure that the side lobes are below a certain level for all $\phi$.

The difference pattern shown in FIG. 16 has a null for $\phi=90°$ and $\phi=270°$. With only one difference beam, unauthorized network access is not prevented for an unauthorized user located at any observation point with $\theta=90°$ or $\theta=270°$. Therefore, at least two difference beams are used for a planar array. The receiving coefficients and array pattern for a $\sin(\phi)$ difference pattern are obtained by rotating the plots as shown in FIGS. 15 and 16 ninety degrees around the z axis. Three total outputs may be calculated according to the following equations:

$$U_A(t) = \sum_{p=1}^{N} A_p u_p(t - t_p),$$

$$U_B(t) = \sum_{p=1}^{N} B_p u_p(t - t_p), \text{ and,}$$

$$U_C(t) = \sum_{p=1}^{N} C_p u_p(t - -t_p),$$

where $A_p$ represents the receiving coefficients for the sum pattern beam and $t_p$ represents the time delays that point the beam toward the authorized transmitter with the desired signal. Moreover, $B_p$ and $C_p$ represent the receiving coefficients for the difference pattern beams with $\cos(\phi)$ and $\sin(\phi)$ difference patterns, respectively. The equations sum the individual element outputs over the 2D grid of array elements. The amplitude of the difference pattern beams are adjusted to ensure that the sum of the difference pattern beams has a higher magnitude than the sum pattern beam outside the direction of the authorized transmitter.

$E_A$, $E_B$, and $E_C$ represent the energies of $U_A(t)$, $U_B(t)$, and $U_C(t)$, respectively, measured during an appropriate time interval as previously discussed. The guard processor prevents an unauthorized transmitter from getting access to the network by following the procedure:

If $E_A > E_B + E_C$, then the information in the sum output $U_A(t)$ equals the information transmitted by the authorized transmitter, and the information is passed on to the network.

If $E_A < E_B + E_C$, then the sum output $U_A(t)$ may contain the information transmitted by an unauthorized transmitter, and access to the network is denied.

In this particular embodiment, the guard processor bases its decision on a comparison of $E_A$ and $E_B + E_C$. Alternatively, one could compare $E_A$ with a different combination of $E_B$ and $E_C$, or with the energy obtained by combining $U_B(t)$ and $U_C(t)$.

Figure 18:
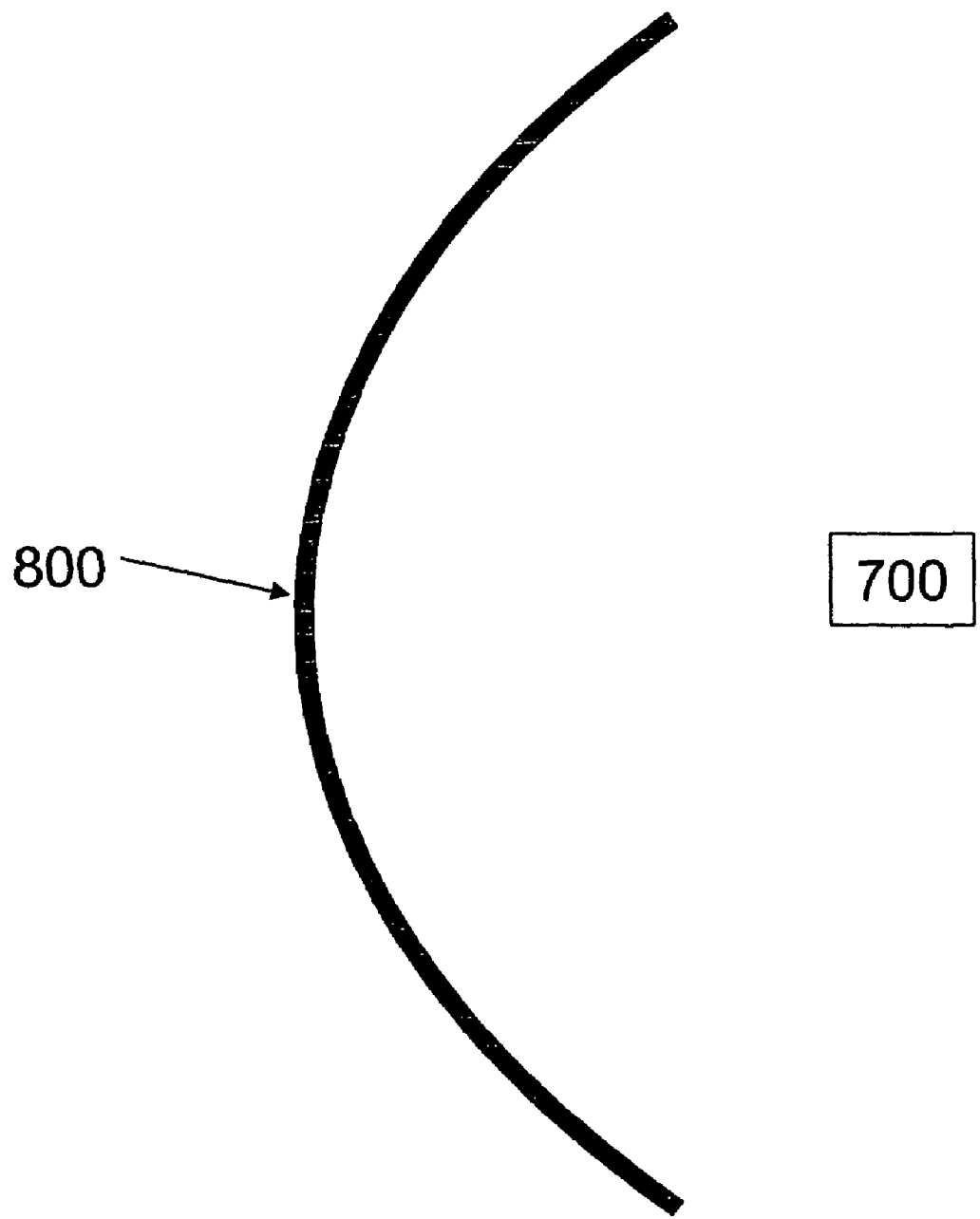
FIG. 18 is a perspective view of a reflector antenna with its receiving device at the focal point.

Secure communication in accordance with the present invention may also be achieved with arrays that are neither linear nor planar. For example, the circular ring array shown in FIG. 17 is useful for providing 360° coverage. For ring arrays, unauthorized transmitters can be prevented from accessing the network by comparing the energies received by sum and difference patterns obtained from standard theory. Similar security measures can be realized with reflector antennas as shown in FIG. 18 by applying the present invention to its receiving device, which is typically a smaller antenna located at the focal point of the reflector surface. More generally, one may use the present invention for any antenna type to obtain sum and difference patterns that can be combined to achieve the secure reception.

The examples herein are confined to sum and difference patterns because such patterns have been studied extensively in the radar literature. The security feature that prevents unauthorized transmitters from gaining access to the network can be achieved, however, with any combination of array patterns in which one of the patterns (the "difference pattern") has a null in the direction of the authorized transmitter and is larger in magnitude than the other pattern (the "sum pattern") in directions where unauthorized transmitters may be present.

The numerical simulation involving the 18-element linear array demonstrates that the present invention also works when the antenna receives signals simultaneously from several authorized transmitters.

The difference patterns must be slightly broader than the sum patterns to achieve the security feature. The numerical examples presented herein demonstrate that difference patterns may be designed to have beam widths that are just slightly broader than the beam widths of the corresponding sum patterns.

Although the present invention and its advantages have been described in detail, it should be understood that various changes, substitutions, and alterations can be made herein without departing from the invention as defined by the appended claims. Moreover, the scope of the present application is not intended to be limited to the particular embodiments of the process, machine, manufacture, composition of matter, means, methods, and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for securely transmitting data over radio waves comprising:

transmitting one or more data beams wherein each said data beam comprises data and a radiation pattern, transmitting one or more scramble beams comprising one or more signals from which data cannot be inferred and one or more radiation patterns, and, adjusting said one or more data beams and said one or more scramble beams such that said one or more scramble beams overshadow said one or more data beams in all but selected directions.

2. The method of claim 1, wherein at least one of said one or more scramble beams contains a separate intelligible data stream intended for one or more receivers located in directions where said one scramble beam overshadows all other beams.

3. The method of claim 1, wherein at least one of said one or more scramble beams contains an intelligible data stream that is used to convey information for one or more transceivers located in directions where said one scramble beam overshadows all other beams, wherein said information comprises information about which of said one or more transceivers will communicate using one or more data beams.

4. The method of claim 1, wherein a communication channel provided by said one or more scramble beams is used to organize a contention period.

5. The method of claim 4, wherein said contention period uses a multiple access control method.

6. The method of claim 4, wherein said one or more scramble beams organize said contention period using a binary countdown method.

7. The method of claim 1, wherein said one or more scramble beams comprise one or more difference patterns.

8. The method of claim 1, wherein said one or more data beams comprise one or more sum patterns.

9. The method of claim 1, further comprising adjusting said one or more data beams and said one or more scramble beams using beam steering.

10. The method of claim 1, further comprising transmitting said one or more data beams and transmitting said one or more scramble beams using one or more array antennas.

11. The method of claim 1, further comprising adjusting said one or more data beams and said one or more scramble beams using analytical array synthesis techniques.

12. The method of claim 1, further comprising adjusting said one or more data beams and said one or more scramble beams using iterative array synthesis techniques.

13. The method of claim 1, wherein said one or more scramble beams have approximately constant amplitudes away from a central null, and the total radiated power is approximately omni-directional.

14. The method of claim 13, wherein constant-amplitude scramble beams are achieved by moving zeros off a Schelkunoff unit circle.

15. The method of claim 13, wherein constant-amplitude scramble beams are achieved by iterative methods.

16. The method of claim 1, wherein data signal bits of one of said one or more data beams are divided into a plurality of parts.

17. The method of claim 16, wherein for each part of said plurality of parts, a corresponding scramble-beam direction is defined slightly away from the direction of said one data beam.

18. The method of claim 16, wherein each part of said plurality of parts is transmitted while a scramble beam has a central null steered in the direction of a corresponding scramble-beam direction.

19. The method of claim 1, wherein the spatial dependences of said one or more data beams and said one or more scramble beams are indistinguishable away from a null of one of said one or more scramble beams.

20. The method of claim 1, further comprising transmitting said one or more data beams and said one or more scramble beams using a planar array antenna.

21. The method of claim 20, further comprising transmitting said one or more scramble beams using cosine and sine difference patterns.

22. The method of claim 1, further comprising scanning one or more secure data beams in angular increments using beam steering while transmitting at each said angular increment a unique identification number identifying and locating transceivers within range.

23. The method of claim 22, further comprising using said unique identification number to create and store a table indicating the current positions and signal strengths of transceivers within range.

24. The method of claim 22, wherein said transceivers are RFID tags.

25. The method of claim 22, wherein said transceivers are laptop computers.

26. The method of claim 22, wherein said transceivers are mobile phones.

* * * * *